United States Patent
Yamamoto et al.

(10) Patent No.: US 6,927,375 B2
(45) Date of Patent: Aug. 9, 2005

(54) OPTICAL ELEMENT, OPTICAL HEAD AND OPTICAL INFORMATION PROCESSOR

(75) Inventors: Hiroaki Yamamoto, Kawabe-gun (JP); Yoshiaki Komma, Hirakata (JP); Shin-ichi Kadowaki, Sanda (JP); Sadao Mizuno, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 153 days.

(21) Appl. No.: 10/312,436

(22) PCT Filed: Jun. 25, 2001

(86) PCT No.: PCT/JP01/05432
§ 371 (c)(1),
(2), (4) Date: Dec. 27, 2002

(87) PCT Pub. No.: WO02/01555
PCT Pub. Date: Jan. 3, 2002

(65) Prior Publication Data
US 2003/0098405 A1 May 29, 2003

(51) Int. Cl.[7] ............................. G02B 27/42; G11B 7/00
(52) U.S. Cl. ............................. 250/201.5; 250/237 G; 250/225; 369/112.03; 369/112.15
(58) Field of Search ........................ 250/201.5, 237 G, 250/237 R, 216, 225; 369/103, 109.01, 112.03–112.07, 112.12, 112.1, 112.15, 44.11, 44.14, 44.26, 44.35

(56) References Cited
U.S. PATENT DOCUMENTS 5,737,296 A  *  4/1998  Komma et al. .......... 369/44.23
5,920,537 A  *  7/1999  Komma et al. ........ 369/112.04

FOREIGN PATENT DOCUMENTS

JP          8-329512          12/1996
JP           9-7212           1/1997

* cited by examiner

*Primary Examiner*—Kevin Pyo
(74) *Attorney, Agent, or Firm*—Hamre, Schumann, Mueller & Larson, P.C.

(57) ABSTRACT

A light beam reflected by an information medium is split by a diffraction optical system into first diffraction light and second diffraction light, which is not a complex conjugate wave of the first diffraction light, in a predetermined energy distribution ratio. The first diffraction light enters a first photodetector (195) of a photodetector and is used for reading out data information recorded on the information medium, while the second diffraction light enters second and third photodetectors (194, 195) and is used for obtaining a servo error signal. With this optical head device, the area of the first photodetector can be reduced, thus allowing a high-speed reproduction of a data signal. Further, the first photodetector becomes less susceptible to stray light. Moreover, the number of head amplifiers, which are needed for detecting the data signal, decreases, and the S/N ratio improves.

12 Claims, 22 Drawing Sheets

OPTICAL ELEMENT, OPTICAL HEAD AND OPTICAL INFORMATION PROCESSOR

TECHNICAL FIELD

The present invention relates to an optical head device, an optical information processing apparatus and an optical element for recording/reproducing or erasing information that is stored in an optical medium such as an optical disk or an optical card.

BACKGROUND ART

With the development of optical disks in recent years, the variety of optical disks in use such as recording and reproducing optical disks and read-only memory (ROM) optical disks has been increasing. Under such circumstances, an optical head device that can reproduce information from these plural types of optical disks has been devised.

In the following, a conventional technology will be described with reference to FIG. 21. In FIG. 21, numeral 160 denotes an LD-PD (Laser Diode Photo Detector) unit that is arranged so as to emit light polarized in an x-axis direction. The LD-PD unit 160, which will be described more specifically later, has photodetectors for detecting light containing a signal and a semiconductor laser serving as a light source that are fixed in a certain positional relationship. Numeral 102 denotes a collimator lens. Numeral 180 denotes a polarization anisotropic hologram having a function of transmitting light polarized in a certain direction and diffracting light polarized in a direction perpendicular thereto, which is arranged so as to transmit light polarized in the x-axis direction. Numeral 115 denotes a ¼ wave plate, and numeral 103 denotes an objective lens. Numeral 106 denotes a holder for maintaining the positional relationship between the polarization anisotropic hologram 180, the ¼ wave plate 115 and the objective lens 103. Numeral 105 denotes an optical disk that is arranged so that its tangential direction corresponds to a y-axis direction. Numeral 112 denotes a driving member for driving the holder 106.

The following is an explanation of its operation. A linearly polarized light beam L0 emitted from a radiation light source in the LD-PD unit 160 is not diffracted by the polarization anisotropic hologram 180 because it is polarized in the x-axis direction, and then reaches the ¼ wave plate 115. This light beam further passes through the ¼ wave plate 115, becomes circularly polarized by an effect of the ¼ wave plate 115, enters the objective lens 103 and is converged on the optical disk 105 (outgoing path).

The light beam reflected by the optical disk 105 travels backward along the optical path, passes through the ¼ wave plate 115 again, becomes linearly polarized light beam whose polarization direction is perpendicular to that of the original light beam (the y-axis direction), and then enters the polarization anisotropic hologram 180. Returning +1-order diffraction light L1 and −1-order diffraction light L2 that are generated from the polarization anisotropic hologram 180 reach photodetectors arranged in the LD-PD unit 160 where a servo error signal and a recorded information signal are detected.

The following is a detailed description of how the signals are detected, with reference to FIGS. 22 and 23. FIG. 22 is a schematic view showing the polarization anisotropic hologram 180, and FIG. 23 is a schematic view showing the LD-PD unit 160.

As shown in FIG. 22, the polarization anisotropic hologram 180 is divided into large regions A, B, C and D by straight lines that pass through the center of the polarization anisotropic hologram 180 (the same as an optical axis) and are parallel to the x-axis and the y-axis, respectively. Furthermore, each of the regions is divided into small strap-like regions by a plurality of straight lines. Within one large region, hologram patterns with the same functions are formed in every other small strap-like regions. Hereinafter, the regions having the same hologram patterns are altogether referred to as one small region (region Ab, Af, Bb, Bf, Cb, Cf, Db, Df).

As shown in FIG. 23, the LD-PD unit 160 has a photodetector 191 and a photodetector 192, which are arranged on both sides of a light-emitting point (or a point equivalent to a light-emitting point) P. The photodetector 191 is divided into two regions across the y-axis direction, and each of them further is divided into two regions by a straight line that is parallel to the x-axis, thus forming regions FE1, FE2 and regions FE3, FE4. Also, the photodetector 192 is divided into four regions (regions TEa, TEb, TEc, TEd) by straight lines that are parallel to the x-axis and the y-axis, respectively.

The returning light that has entered the polarization anisotropic hologram 180 is converted into the returning +1-order diffraction light L1 and −1-order diffraction light L2 by a diffraction effect of the polarization anisotropic hologram 180.

As described above, the polarization anisotropic hologram 180 is divided into a plurality of regions, which are formed so as to diffract light in different directions and wavefronts. Each region of the polarization anisotropic hologram 180 is designed so as to function in the following manner when the smallest light spot is formed on a recording surface of the optical disk 105 (in a focused state).

The +1-order diffraction light L1 generated from the light that has entered each region of the polarization anisotropic hologram 180 shown in FIG. 22 reaches each position in the photodetector 191 shown in FIG. 23 as follows.

The light that has entered the region Ab reaches the position indicated by L1Ab in the photodetector 191 so as to converge on a back side (at the position with a smaller z coordinate) with respect to the photodetector 191. The light that has entered the region Af reaches the position indicated by L1Af in the photodetector 191 so as to converge on a front side (at the position with a larger z coordinate) with respect to the photodetector 191.

The light that has entered the region Bb reaches the position indicated by L1Bb in the photodetector 191 so as to converge on the back side (at the position with a smaller z coordinate) with respect to the photodetector 191. The light that has entered the region Bf reaches the position indicated by L1Bf in the photodetector 191 so as to converge on the front side (at the position with a larger z coordinate) with respect to the photodetector 191.

The light that has entered the region Cb reaches the position indicated by L1Cb in the photodetector 191 so as to converge on the back side (at the position with a smaller z coordinate) with respect to the photodetector 191. The light that has entered the region Cf reaches the position indicated by L1Cf in the photodetector 191 so as to converge on the front side (at the position with a larger z coordinate) with respect to the photodetector 191.

The light that has entered the region Db reaches the position indicated by L1Db in the photodetector 191 so as to converge on the back side (at the position with a smaller z coordinate) with respect to the photodetector 191. The light that has entered the region Df reaches the position indicated by L1Df in the photodetector 191 so as to converge on the front side (at the position with a larger z coordinate) with respect to the photodetector 191.

Next, the −1-order diffraction light L2 that is generated by the polarization anisotropic hologram 180 enters the photodetector 192 as follows.

The light that has entered the region Ab in FIG. 22 reaches the position indicated by L2Ab in FIG. 23. The light that has entered the region Af reaches the position indicated by L2Af.

The light that has entered the region Bb reaches the position indicated by L2Bb. The light that has entered the region Bf reaches the position indicated by L2Bf.

The light that has entered the region Cb reaches the position indicated by L2Cb. The light that has entered the region Cf reaches the position indicated by L2Cf.

The light that has entered the region Db reaches the position indicated by L2Db. The light that has entered the region Df reaches the position indicated by L2Df.

An optical head device with the above-described configuration can detect various signals in the following manner. A tracking error signal is detected by the photodetector 192. When detecting the tracking error signal, one of two methods is used suitably depending on the type of the optical disk 105. In other words, a push-pull method is used for an optical disk with a continuous groove (for example, a recording/reproducing optical disk), while a phase difference method is used for an optical disk with pit-shaped track information (for example, a ROM disk).

When a signal output from each region of the photodetector 192 is expressed by the name of this region, a tracking error signal TE according to the push-pull method can be obtained by $$TE=(TEa+TEb)-(TEc+TEd). \tag{1}$$

The tracking error signal TE according to the phase difference method can be obtained by phase comparison of (TEa+TEc) and (TEb+TEd).

A focus error signal FE is detected by the photodetector 191. When a signal output from each region of the photodetector 191 is expressed by the name of this region, the focus error signal FE can be obtained by $$FE=(FE1+FE3)-(FE2+FE4). \tag{2}$$

A data signal S can be obtained by totaling signals from the photodetector 191 and the photodetector 192, i.e., $$S=TEa+TEb+TEc+TEd+FE1+FE2+FE3+FE4. \tag{3}$$

In the optical head device with the conventional configuration described above, the data signal S has been detected by the sum of servo error signals (the focus error signal FE and the tracking error signal TE). Since the photodetector for detecting the servo error signals has to detect incident light in a defocused state, it has been necessary for the photodetector to have a large light-receiving area. An increase in the light-receiving area results in a larger capacitance of the photodetector. Consequently, the frequency characteristics of a detected signal deteriorate, leading to a problem that the data signal cannot be reproduced at a high speed.

Moreover, since the light-receiving area is large, the optical head device easily is affected by stray light. Thus, in a system with much stray light, for example, a system for reproducing information from an optical disk with many layers in which the information is recorded, a signal to noise ratio (S/N) deteriorates, causing a problem that an excellent reproduction signal cannot be obtained.

DISCLOSURE OF INVENTION

It is an object of the present invention to solve the conventional problems described above and to provide an optical head device in which a light-receiving area of a light-receiving element for detecting a data signal can be reduced, thereby achieving improved fast response characteristics and reduced susceptibility to stray light. It is a further object of the present invention to provide an optical element that is suitable for realizing such an optical head device. Furthermore, it is an object of the present invention to provide an optical information processing apparatus in which the number of head amplifiers necessary for detecting a data signal can be reduced, thereby obtaining a data signal with reduced amplifier noise.

In order to achieve the above-mentioned objects, the present invention has the following configuration.

An optical head device with a first basic configuration according to the present invention includes a radiation light source, a converging optical system for converting a light beam from the radiation light source onto an information medium and forming a minute spot, a photodetector, divided into a plurality of regions, for receiving the light beam reflected by the information medium and outputting a photoelectric current, and a diffraction optical system for diffracting the light beam reflected by the information medium as a diffraction light beam and directing it to the photodetector. The diffraction optical system generates a first diffraction light beam and a second diffraction light beam from an incident light beam. The first diffraction light beam enters a first detection region in the photodetector, and second diffraction light beam is not a higher order diffraction light beam accompanied with the first diffraction light beam. Information recorded on the information medium is read out using the first diffraction light beam alone, while a servo error signal is obtained using the second diffraction light beam.

An optical head device with a second basic configuration according to the present invention includes a radiation light source, a converging optical system for converging a light beam from the radiation light source onto an information medium and forming a minute spot, a photodetector, divided into a plurality of regions, for receiving the light beam reflected by the information medium and outputting a photoelectric current, and a diffraction optical system for diffracting the light beam reflected by the information medium as a diffraction light beam and directing it to the photodetector. The diffraction optical system includes a first diffraction region and a second diffraction region. The first diffraction region generates a first diffraction light beam and a second diffraction light beam from an incident light beam. The first diffraction light beam enters a first detection region in the photodetector, and the second diffraction light beam is not a higher order diffraction light beam accompanied with the first diffraction light beam. The second diffraction region generates a third diffraction light beam and a fourth diffraction light beam from an incident light beam. The third diffraction light beam enters a second detection region in the photodetector and the fourth diffraction light beam is not a higher order diffraction light beam accompanied with the third diffraction light beam. Information recorded on the information medium is read out using the first diffraction light beam and the third diffraction light beam alone, while a servo error signal is obtained using the second diffraction light beam and the fourth diffraction light beam.

In accordance with the first and second optical head devices described above, the information recorded on the information medium is read out using the diffraction light beam that is different from the diffraction light beam for obtaining the servo error signal. Thus, it is possible to provide a photodetection region exclusively for reading out the information recorded on the information medium, thus achieving a smaller area of the photodetection region. As a result, an optical head device having excellent frequency characteristics and allowing a high-speed reproduction of a data signal can be achieved. Furthermore, it is not easily affected by stray light, and thus can obtain an excellent reproduction signal even in a system with much stray light (for example, a system for reproducing information from an optical disk with many layers in which the information is recorded).

In the optical head device with any of the basic configurations described above, it is preferable that the radiation light source and the photodetector are arranged and fixed close to each other.

In this configuration, a reflection mirror further may be provided for reflecting the light beam from the radiation light source substantially perpendicularly to a surface of the photodetector.

Alternatively, it is possible to provide further a rigid body including a first surface and a second surface that are substantially perpendicular to each other, so that the radiation light source is fixed substantially to the first surface, and the photodetector is fixed substantially to the second surface.

Alternatively, the radiation light source can be fixed to a surface of a holding member, a reflection mirror for reflecting the light beam from the radiation light source substantially perpendicularly to the surface of the holding member can be formed or disposed on the holding member, and the holding member and the photodetector can be fixed substantially to a single surface of a single rigid body.

Alternatively, the radiation light source can be a surface emitting laser, and the radiation light source and the photodetector can be fixed substantially to a single surface of a single rigid body.

In the optical head device with any of the configurations described above, the region for photodetection for reading out the information recorded on the information medium can be arranged at a position along a tangential direction of the information medium with respect to the light-emitting position of the radiation light source.

In the optical head device with any of the configurations described above, the region for photodetection for detecting a focus error signal can be divided into a plurality of regions by a straight line in a radial direction of the information medium.

In this case, the plurality of regions for detecting the focus error signal can be arranged away from each other, at positions along the radial direction of the recording medium with respect to a light-emitting position of the radiation light source.

In the optical head device with any of the configurations described above, the diffraction light beam for reading out the information recorded on the information medium can be converged to the region for photodetection for reading out the information recorded on the information medium.

In the optical head device with any of the configurations described above, the diffraction optical system can generate both a +1-order diffraction light beam and a −1-order diffraction light beam for detecting the servo error signal. In the optical head device with this configuration, a focus error signal can be detected with the +1-order diffraction light beam, and a tracking error signal can be detected with the −1-order diffraction light beam.

An optical element with a basic structure according to the present invention transmits a light beam polarized in a first direction and diffracts a light beam polarized in a second direction that is perpendicular to the first direction. The optical element diffracts an incident light beam polarized in the second direction as a first diffraction light beam including no complex conjugate wave at a predetermined efficiency, and generates a diffraction light beam whose wavefront is different from that of a higher order diffraction light beam of the first diffraction light beam.

By using this optical element, the above-described optical head device of the present invention can be realized easily.

It is preferable that the diffraction optical system in the optical head device with any of the configurations described above includes this optical element with the basic structure.

The optical element with the basic structure described above preferably has a first diffraction element for transmitting the light beam polarized in the first direction and diffracting all the light beam polarized in the second direction, and a second diffraction element for transmitting the light beam polarized in the first direction and diffracting the light beam polarized in the second direction at a predetermined efficiency. The first diffraction element includes a first light-transmitting material and a second light-transmitting material. A refractive index of the first light-transmitting material and a refractive index of the second light-transmitting material are equal for the light beam polarized in the first direction and different for the light beam polarized in the second direction. An interface between the first light-transmitting material and the second light-transmitting material has a sawtooth groove shape. The second diffraction element includes a third light-transmitting material and a fourth light-transmitting material. A refractive index of the third light-transmitting material and a refractive index of the fourth light-transmitting material are equal for the light beam polarized in the first direction and different for the light beam polarized in the second direction. An interface between the third light-transmitting material and the fourth light-transmitting material has a groove shape formed of periodic protrusions and depressions. The first diffraction element and the second diffraction element are fixed to each other in a predetermined relative positional relationship.

Also, the optical element with the basic structure described above preferably has a first diffraction element for transmitting the light beam polarized in the first direction and diffracting all the light beam polarized in the second direction, and a second diffraction element for transmitting the light beam polarized in the first direction and diffracting the light beam polarized in the second direction at a predetermined efficiency. The first diffraction element includes a first light-transmitting material and a second light-transmitting material. A refractive index of the first light-transmitting material and a refractive index of the second light-transmitting material are equal for the light beam polarized in the first direction and different for the light beam polarized in the second direction. An interface between the first light-transmitting material and the second light-transmitting material has a step-like shape. The second diffraction element includes a third light-transmitting material and a fourth light-transmitting material. A refractive index of the third light-transmitting material and a refractive index of the fourth light-transmitting material are equal for the light beam polarized in the first direction and different for the light beam polarized in the second direction. An interface between the third light-transmitting material and the fourth light-transmitting material has a groove shape formed of periodic protrusions and depressions. The first diffraction element and the second diffraction element are fixed to each other in a predetermined relative positional relationship.

Furthermore, the optical element with the basic structure described above preferably includes a first light-transmitting material, a second light-transmitting material and a third light-transmitting material. The first light-transmitting material and the second light-transmitting material are adjacent to each other via a first interface, and the second light-transmitting material and the third light-transmitting material are adjacent to each other via a second interface. A refractive index of the first light-transmitting material and a refractive index of the second light-transmitting material are equal for the light beam polarized in the first direction and different for the light beam polarized in the second direction. The refractive index of the second light-transmitting material and a refractive index of the third light-transmitting material are equal for the light beam polarized in the first direction and different for the light beam polarized in the second direction. The first interface has a sawtooth groove shape, and the second interface has a groove shape formed of periodic protrusions and depressions.

Furthermore, the optical element with the basic structure described above preferably includes a first light-transmitting material, a second light-transmitting material and a third light-transmitting material. The first light-transmitting material and the second light-transmitting material are adjacent to each other via a first interface, and the second light-transmitting material and the third light-transmitting material are adjacent to each other via a second interface. A refractive index of the first light-transmitting material and a refractive index of the second light-transmitting material are equal for the light beam polarized in the first direction and different for the light beam polarized in the second direction. The refractive index of the second light-transmitting material and a refractive index of the third light-transmitting material are equal for the light beam polarized in the first direction and different for the light beam polarized in the second direction. The first interface has a step-like shape, and the second interface has a groove shape formed of periodic protrusions and depressions.

Furthermore, the optical element with the basic structure described above preferably includes a first light-transmitting material and a second light-transmitting material. The first light-transmitting material and the second light-transmitting material are adjacent to each other via an interface. A refractive index of the first light-transmitting material and a refractive index of the second light-transmitting material are equal for the light beam polarized in the first direction and different for the light beam polarized in the second direction. A shape of the interface is defined by a shape function expressed by a sum of a function $d_1$ representing a sawtooth groove shape or a step-like shape and a function $d_2$ representing a groove shape formed of periodic protrusions and depressions.

Furthermore, the optical element with the basic structure described above preferably includes a first light-transmitting material and a second light-transmitting material. The first light-transmitting material and the second light-transmitting material are adjacent to each other via an interface. A refractive index of the first light-transmitting material and a refractive index of the second light-transmitting material are equal for the light beam polarized in the first direction and different by $\Delta n$ for the light beam polarized in the second direction. When $\lambda$ is a wavelength of the incident light, a shape of the interface is defined by a shape function expressed by a remainder obtained when dividing by $\lambda/\Delta n$ a sum of a function $d_1$ representing a sawtooth groove shape or a step-like shape and a function $d_2$ representing a groove shape formed of periodic protrusions and depressions.

In the optical element with any of the structures described above, it is possible to provide as one piece a wave plate for converting the light beam polarized in the first direction into a circularly polarized light beam.

In the optical head device with any of the configurations described above, the diffraction optical system can include the optical element with any of the structures describe above.

An optical information processing apparatus in accordance with the present invention includes the optical head device having any of the above-described configurations, and an electric circuit for processing a signal detected by the optical head device and extracting a desired signal.

In accordance with this optical information processing apparatus, an optical information processing apparatus having excellent frequency characteristics and allowing a high-speed reproduction of a data signal can be achieved. Furthermore, it is not easily affected by stray light, and thus can obtain an excellent reproduction signal even in a system with much stray light (for example, a system for reproducing information from an optical disk with many layers in which the information is recorded). Moreover, since the number of head amplifiers for reading out the information recorded on the information medium can be reduced, it is possible to simplify a circuit configuration compared with a conventional one, reduce the amplifier noise and achieve an inexpensive system.

In the optical information processing apparatus with this configuration, the electric circuit can include an electric circuit having a gain only in an information signal frequency band and current/voltage converting and amplifying an output from the photodetector for detecting an information signal recorded on the information medium.

In the optical information processing apparatus with any of the configurations described above, the electric circuit can include an electric circuit having a gain only in a servo signal frequency band and current/voltage converting and amplifying an output from the photodetector for detecting a focus error signal.

In a first configuration for a tracking control in the optical information processing apparatus with any of the configurations described above, the electric circuit includes an electric circuit having a gain only in a servo signal frequency band and current/voltage converting and amplifying an output from the photodetector for detecting a tracking error signal. In the optical information processing apparatus with this configuration, the tracking error signal can be detected by a push-pull method.

Further, in a second configuration for the tracking control in the optical information processing apparatus with any of the configurations described above, the electric circuit includes an electric circuit having a gain only in an information signal frequency band and current/voltage converting and amplifying an output from the photodetector for detecting a tracking error signal. In the optical information processing apparatus with this configuration, the tracking error signal can be detected by a phase difference method.

Moreover, in a third configuration for the tracking control in the optical information processing apparatus with any of the configurations described above, the electric circuit includes an electric circuit having a gain in an information signal frequency band and a servo signal frequency band and current/voltage converting and amplifying an output from the photodetector for detecting a tracking error signal. In the optical information processing apparatus with this configuration, the tracking error signal can be detected by switching or combining a phase difference method and a push-pull method.

BEST MODE FOR CARRYING OUT THE INVENTION (First Embodiment)

Figure 1:
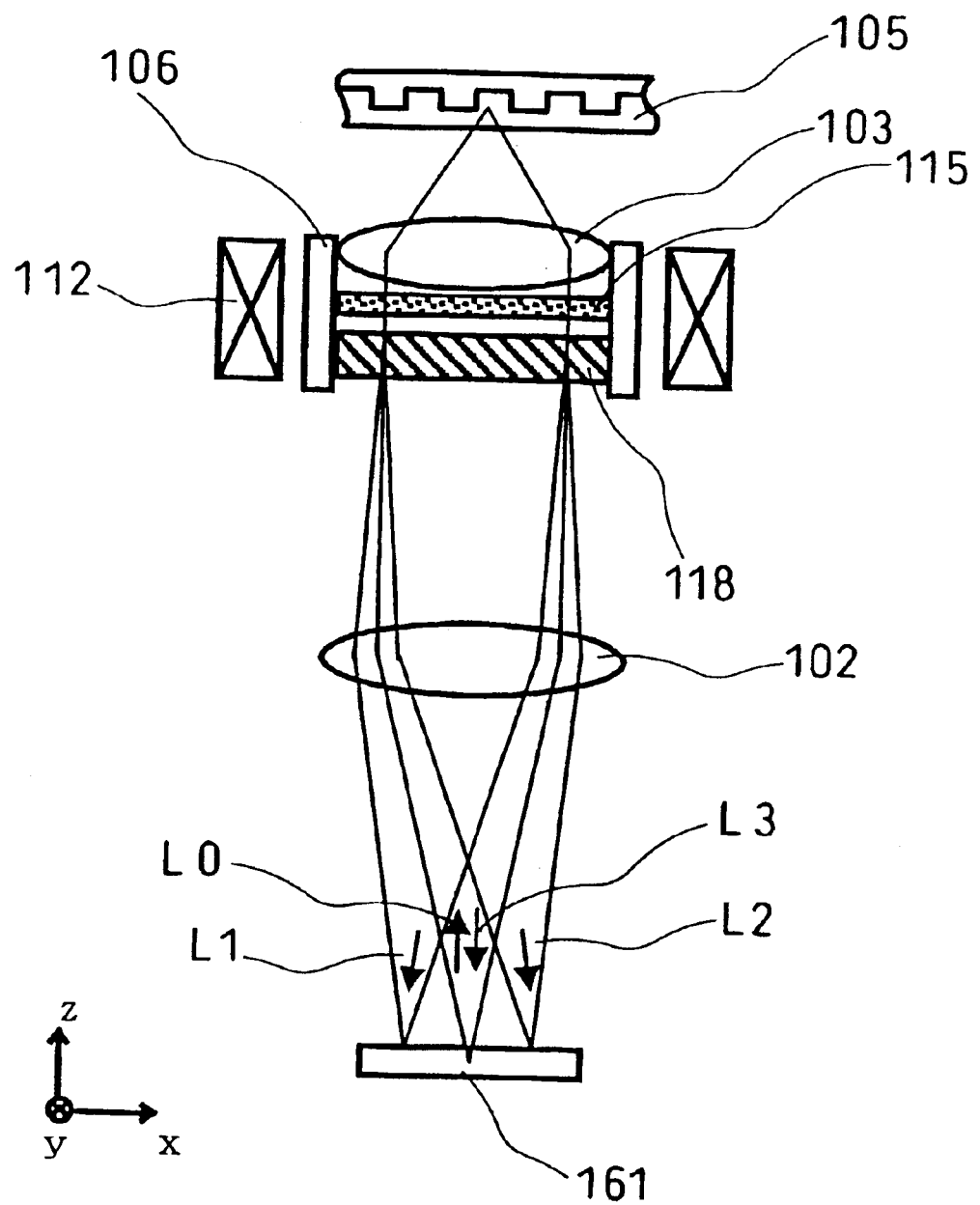
FIG. 1 is a sectional view showing a schematic configuration of an optical head device according to a first embodiment.

The following is a description of the first embodiment of the present invention, with reference to the accompanying drawings. FIG. 1 is a sectional view showing a schematic configuration of an optical head device according to the first embodiment. Hereinafter, for convenience of description, the xyz coordinate axes are set as shown at the bottom left corner of this figure, with the arrow of each axis pointing forward. The forward direction of the y-axis is toward the back of the sheet. In the following, the coordinate axes of FIG. 1 are common to the other drawings unless otherwise specified.

In FIG. 1, numeral 161 denotes an LD-PD unit that is arranged so as to emit light L0 polarized in the x-axis direction. The LD-PD unit 161, which will be described more specifically later, has photodetectors for detecting light containing signals and a semiconductor laser serving as a light source that are fixed in a certain positional relationship.

Numeral 102 denotes a collimator lens, which turns the light emitted from the LD-PD unit 161 into parallel light. Numeral 118 denotes a diffraction optical system having the following function. First, it transmits light polarized in the x-axis direction. Then, it bends the traveling direction of light polarized in the y-axis direction in a certain direction, so that the light whose traveling direction has been bent generates diffraction light as well as transmitted light (zero-order diffraction light). In other words, the diffraction optical system 118 has a function of bending the traveling direction of incident light and diffracting a part of this light. Its specific structure will be described later.

Numeral 115 denotes a ¼ wave plate, and numeral 103 denotes an objective lens. Numeral 106 denotes a holder for maintaining the positional relationship between the diffraction optical system 118, the ¼ wave plate 115 and the objective lens 103. Numeral 105 denotes an optical disk, and numeral 112 denotes a driving member for driving the holder 106.

In FIG. 1, a radial direction of the optical disk 105 at the position of a light spot formed on the optical disk 105 corresponds to the x-axis direction, while a tangential direction of a recording track of the optical disk at this position corresponds to the y-axis direction.

Before the operation of this optical head device is explained, the LD-PD unit 161 and the diffraction optical system 118 used in this optical head device will be described.

Figure 2:
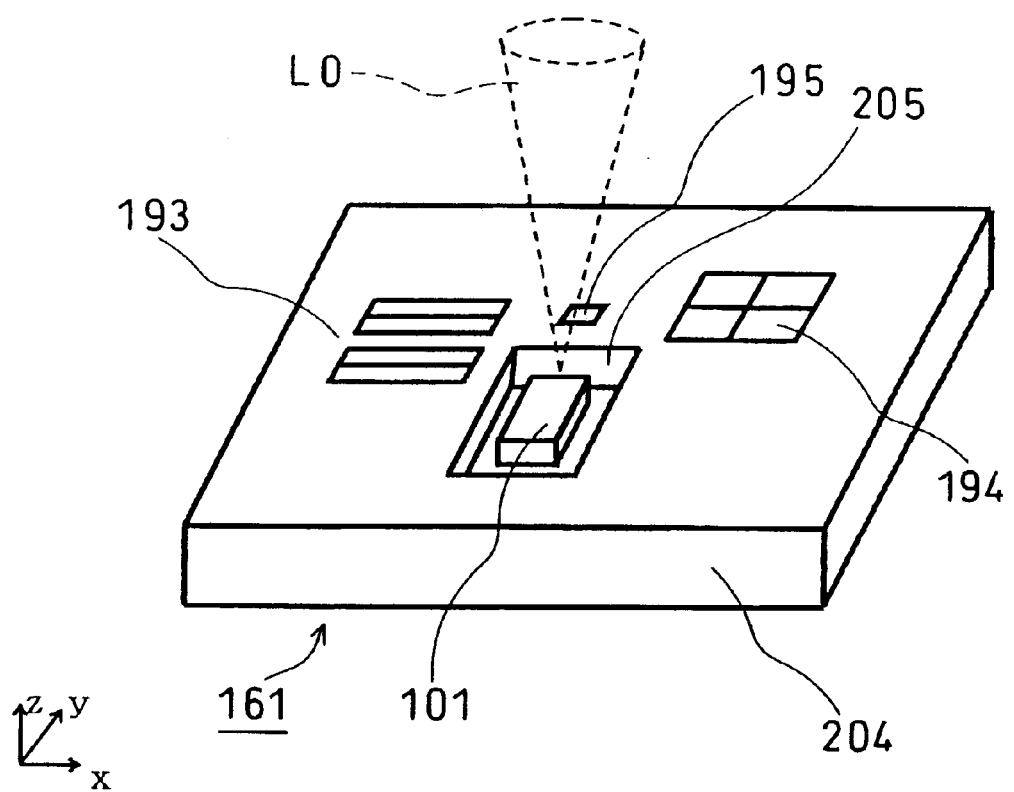
FIG. 2 is a perspective view showing a configuration of an LD-PD unit in FIG. 1.

FIG. 2 is a perspective view showing a configuration of the LD-PD unit 161 in FIG. 1. In FIG. 2, numeral 204 denotes a silicon substrate, numeral 101 denotes a semiconductor laser that is fixed to the silicon substrate 204, and numerals 193, 194 and 195 denote photodetectors that are formed on the surface of the silicon substrate 204. Also, numeral 205 denotes an etched mirror that is formed on the silicon substrate 204 and directs the light emitted from the semiconductor laser 101 toward the side above the silicon substrate 204 (emitted light L0). In the LD-PD unit 161 with such a configuration, the semiconductor laser 101 serving as a light source is fixed directly to the silicon substrate 204. Therefore, the positional relationship between the photodetectors 193, 194 and 195 and the semiconductor laser 101 is stable regardless of temperature variation, vibration and the like. Furthermore, since the semiconductor laser 101 can be surface-mounted, the mounting accuracy is excellent, and mass-production can be achieved easily. Incidentally, the similar effects can be obtained by replacing the etched mirror 205 with a mirror fixed to the silicon substrate 204.

Figure 3:
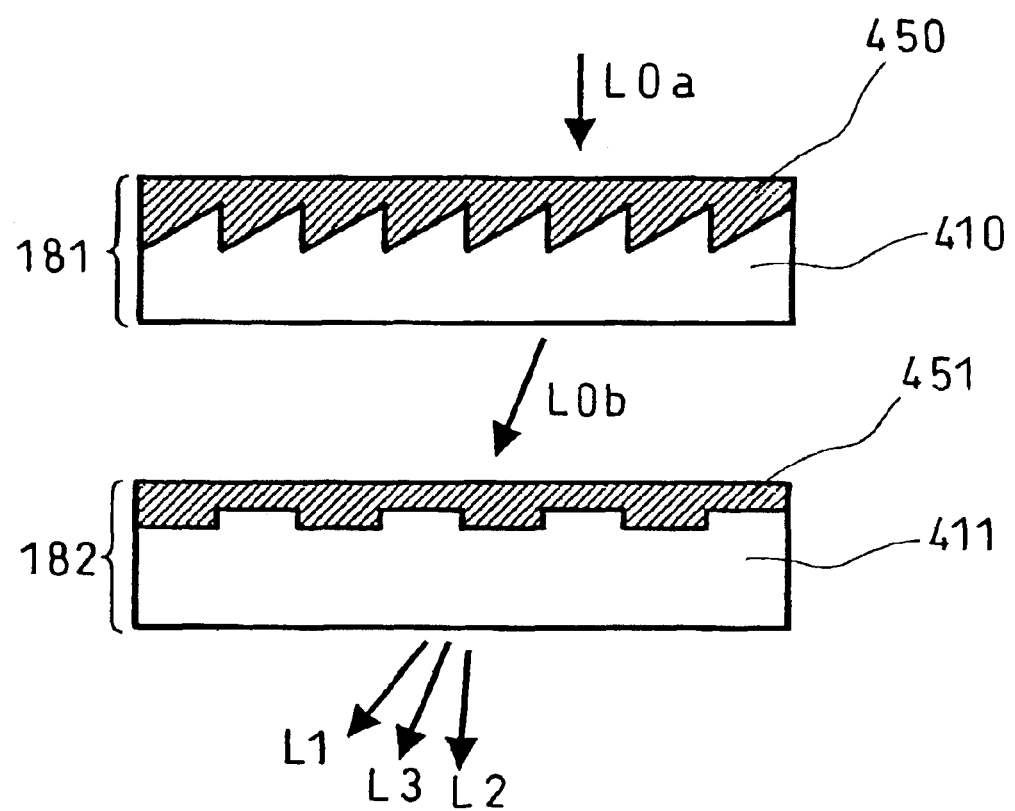
FIG. 3 is a sectional view showing a schematic structure of a diffraction optical system in FIG. 1.

FIG. 3 is a sectional view showing the structure of the diffraction optical system 118. The diffraction optical system 118 includes a polarization anisotropic hologram element 181 and a polarization anisotropic hologram element 182, which are fixed in a predetermined positional relationship.

First, the polarization anisotropic hologram element 181 will be described. Numeral 410 denotes an isotropic substrate whose surface is provided with periodic sawtooth grooves. These sawtooth grooves are filled with a birefringent material 450. The isotropic substrate 410 and the birefringent material 450 are selected so that their refractive indexes in the x-axis direction of FIG. 1 match, and do not diffract light polarized in this direction.

Further, the polarization anisotropic hologram element 181 diffracts light polarized in the y-axis direction of FIG. 1 at maximal efficiency. For this purpose, the depth of the grooves is determined according to a birefringence amount of the birefringent material 450 so that light that has passed through the deepest portion of the groove and light that has passed through the shallowest portion thereof have a phase difference of $2\pi$. With this structure, incident light L0$a$ polarized in the y-axis direction is converted to light polarized in the y-axis direction L0$b$ by the polarization anisotropic hologram element 181.

Next, the polarization anisotropic hologram element 182 will be described. Numeral 411 denotes an isotropic substrate whose surface is provided with grooves formed of periodic protrusions and depressions. These protrusion/depression grooves are filled with a birefringent material 451.

The isotropic substrate 411 and the birefringent material 451 are selected so that their refractive indexes in the x-axis direction of FIG. 1 match, and do not diffract light polarized in this direction.

In addition, the depth of the protrusion/depression grooves is determined according to a birefringence amount of the birefringent material 451 so as to diffract light polarized in the y-axis direction of FIG. 1 at predetermined diffraction efficiency and transmittance. When the ratio of the protrusion to the depression composing the grooves is 1:1, +1-order diffraction light (L1) and −1-order diffraction light (L2) have the same diffraction efficiency $\eta$, which is expressed by the following equation:

$$\eta=(2/\pi)^2 \cdot \sin^2((4\pi/\lambda)\Delta n \cdot d) \quad (4)$$

wherein d is the depth of the groove, $\Delta n$ is a difference in the refractive indexes with respect to light polarized in the y-axis direction between the isotropic substrate 411 and the birefringent material 451, and $\lambda$ is a wavelength of the light source.

Further, the efficiency of transmitted light (L3) $\eta_0$ is expressed by the following equation:

$$\eta_0=\cos^2((4\pi/\lambda)\Delta n \cdot d). \quad (5)$$

For example, in the case of $\Delta n=0.1$ and $\lambda=0.65$ $\mu$m, it is appropriate to set d=0.4 $\mu$m for obtaining the efficiency of transmitted light $\eta_0$=50%. The diffraction efficiency at this time is 20% for both the +1-order diffraction light (L1) and the −1-order diffraction light (L2). (This efficiency is taken as an example in the following description.)

In this manner, the diffraction optical system 118 that bends the traveling direction of the incident light and diffracts a part of this light can be realized. Although the grooves formed on the isotropic substrate 410 and those formed on the isotropic substrate 411 are illustrated in the same direction (the direction toward the back of the sheet) in FIG. 3 for convenience, they are formed in different directions in practice. In other words, adjustment is made so that the +1-order diffraction light (L1), the −1-order diffraction light (L2) and the transmitted light (L3) enter suitably the photodetectors 193, 194 and 195 on the LD-PD unit 161 in FIG. 2, respectively.

The isotropic substrate is not limited to a substrate formed of a single material but may be one obtained by forming or bonding a transparent material of a different type onto a substrate transparent to a used wavelength. A similar effect can be obtained by using a birefringent substrate and filling it with an isotropic material. Furthermore, it may be possible to use one obtained by forming a birefringent material on the surface of an isotropic substrate instead of the birefringent substrate. In addition, the ¼ wave plate 115 also may be formed as one piece with the surface of the polarization anisotropic hologram element 181 or the polarization anisotropic hologram element 182 that is facing away from the other, thereby simplifying the optical system.

The following is an explanation of the operation of the optical head device of the first embodiment, with reference to FIG. 1. A linearly polarized light beam L0 emitted from the LD-PD unit 161 is turned into a parallel light beam by the collimator lens 102 and reaches the polarization anisotropic hologram element 181. This light beam is not diffracted by the polarization anisotropic hologram element 181 or the polarization anisotropic hologram element 182 because it is polarized in the x-axis direction, and then reaches the ¼ wave plate 115. This light beam further passes through the ¼ wave plate 115, and is turned into a circularly polarized light beam by an effect of the ¼ wave plate 115. This circularly polarized light beam enters the objective lens 103 and is converged on the optical disk 105 (outgoing path).

The light beam reflected by the optical disk 105 travels backward along the optical path, passes through the ¼ wave plate 115 again, becomes linearly polarized light beam whose polarization direction is perpendicular to that of the original light beam (the y-axis direction), and then enters the diffraction optical system 118. The diffraction optical system 118 converts the incident light beam into the light whose traveling direction is bent (L3), and the +1-order diffraction light (L1) and −1-order diffraction light (L2), which are obtained by diffracting a part of L3.

The +1-order diffraction light (L1) and the −1-order diffraction light (L2) respectively enter the photodetector 193 and the photodetector 194 that are arranged on the LD-PD unit 161 shown in FIG. 2 and divided into a plurality of regions, and servo error signals are detected with signals from these regions. The light beam L3 that has been transmitted by the polarization anisotropic hologram element 182 is converged to the photodetector 195 that is arranged close to an equivalent light-emitting point along the y-axis direction and then detected as a data signal. Such a close arrangement makes it possible to suppress spot shifts owing to error factors such as wavelength variation and reduce a necessary light-receiving area. Furthermore, the photodetector 195 is arranged along the y-axis direction because it should be placed at a closest possible position to the light-emitting point. This arrangement is consistent with the need for aligning the photodetectors 193 and 194 in the x-axis direction.

Figure 4:
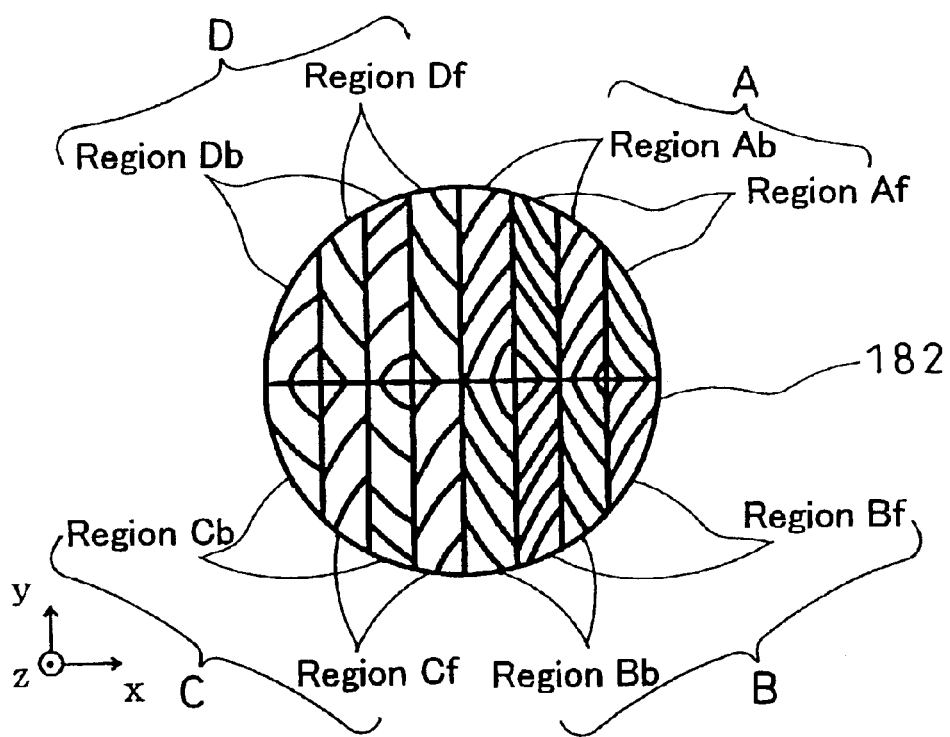
FIG. 4 is a plan view showing schematically a polarization anisotropic hologram element in FIG. 1.
Figure 5:
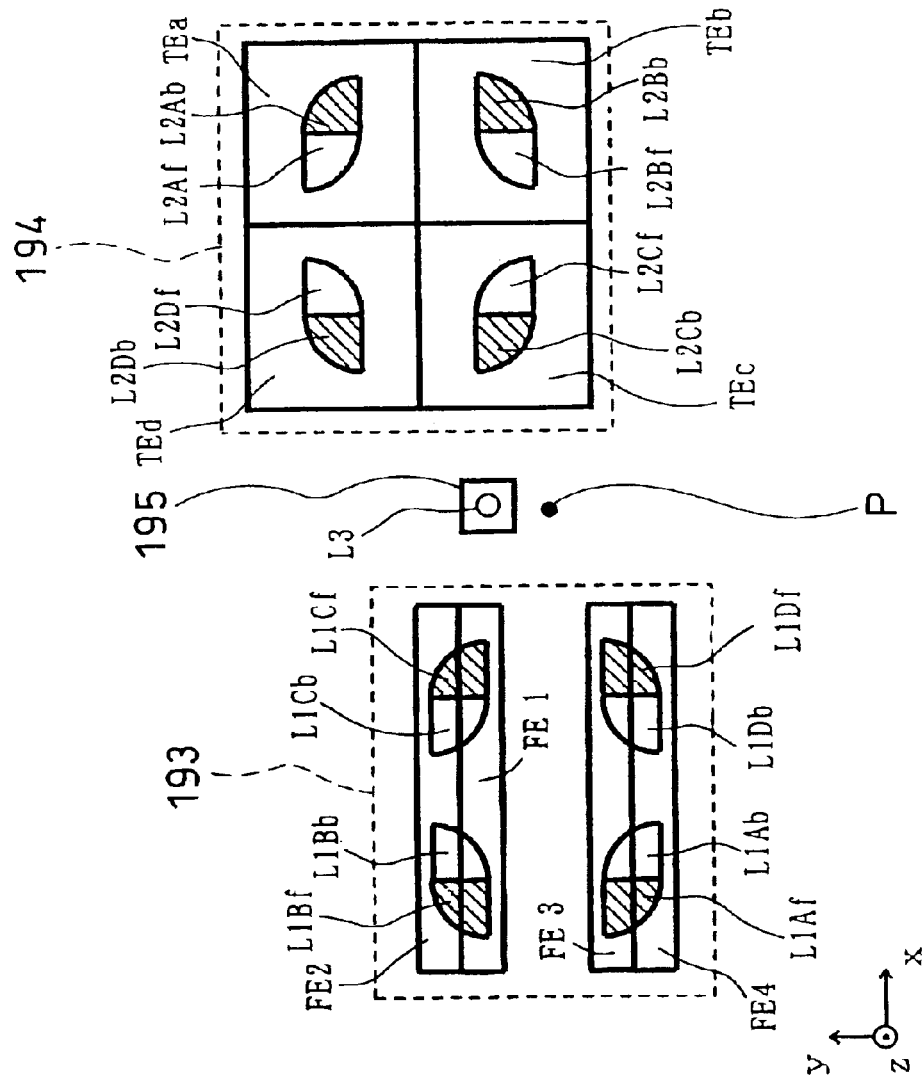
FIG. 5 is a plan view showing schematically shapes of light-receiving elements and a position of a light-emitting point in the LD-PD unit shown in FIG. 2.

The following is a detailed description of how the servo error signals are detected. FIG. 4 is a schematic view showing the polarization anisotropic hologram element 182. FIG. 5 is a schematic view showing the shapes of the photodetectors in the LD-PD unit 161 and the position of the light-emitting point.

As shown in FIG. 5, the photodetector 193 and the photodetector 194 in the LD-PD unit 161 are arranged on both sides of a light-emitting point (or a point equivalent to a light-emitting point) P. The y coordinate at the center of the photodetector 193 corresponds to the y coordinate at the equivalent light-emitting point of the semiconductor laser 101. This arrangement serves to reduce susceptibility to the error factors such as wavelength variation.

The photodetector 193 is divided into two regions across the y-axis direction, and each of them further is divided into two regions (regions FE1, FE2 and regions FE3, FE4) by a straight line that is parallel to the x-axis. Also, the photodetector 194 is divided into four regions (regions TEa, TEb, TEc, TEd) by straight lines that are parallel to the x-axis and the y-axis, respectively.

As shown in FIG. 4, the polarization anisotropic hologram element 182 is divided into large regions A, B, C and D by straight lines that pass the center of this hologram element 182 (the same as the optical axis) and are parallel to the x-axis and the y-axis, respectively. Furthermore, each of the regions is divided into strap-like regions by a plurality of straight lines.

The returning light that has entered the polarization anisotropic hologram element 182 is converted into the returning +1-order diffraction light L1 and −1-order diffraction light L2 by a diffraction effect of the polarization anisotropic hologram element 182.

As described above, the polarization anisotropic hologram element 182 is divided into a plurality of regions, which are formed so as to diffract light in different directions and wavefronts. Each region of the polarization anisotropic hologram element 182 is designed so as to function in the following manner when the smallest light spot is formed on a recording surface of the optical disk 105 (in a focused state).

The +1-order diffraction light L1 generated from the light that has entered each region of the polarization anisotropic hologram element 182 shown in FIG. 4 reaches each position in the photodetector 193 shown in FIG. 5 as follows.

The light that has entered the region Ab reaches the position indicated by L1Ab in the photodetector 193 so as to converge on a back side (at the position with a smaller z coordinate) with respect to the photodetector 193. The light that has entered the region Af reaches the position indicated by L1Af in the photodetector 193 so as to converge on a front side (at the position with a larger z coordinate) with respect to the photodetector 193.

The light that has entered the region Bb reaches the position indicated by L1Bb in the photodetector 193 so as to converge on the back side (at the position with a smaller z coordinate) with respect to the photodetector 193. The light that has entered the region Bf reaches the position indicated by L1Bf in the photodetector 193 so as to converge on the front side (at the position with a larger z coordinate) with respect to the photodetector 193.

The light that has entered the region Cb reaches the position indicated by L1Cb in the photodetector 193 so as to converge on the back side (at the position with a smaller z coordinate) with respect to the photodetector 193. The light that has entered the region Cf reaches the position indicated by L1Cf in the photodetector 193 so as to converge on the front side (at the position with a larger z coordinate) with respect to the photodetector 193.

The light that has entered the region Db reaches the position indicated by L1Db in the photodetector 193 so as to converge on the back side (at the position with a smaller z coordinate) with respect to the photodetector 193. The light that has entered the region Df reaches the position indicated by L1Df in the photodetector 193 so as to converge on the front side (at the position with a larger z coordinate) with respect to the photodetector 193.

Next, the −1-order diffraction light L2 that is generated by the polarization anisotropic hologram element 182 enters the following position in the photodetector 194.

The light that has entered the region Ab in FIG. 4 reaches the position indicated by L2Ab in FIG. 5. The light that has entered the region Af reaches the position indicated by L2Af.

The light that has entered the region Bb reaches the position indicated by L2Bb. The light that has entered the region Bf reaches the position indicated by L2Bf.

The light that has entered the region Cb reaches the position indicated by L2Cb. The light that has entered the region Cf reaches the position indicated by L2Cf.

The light that has entered the region Db reaches the position indicated by L2Db. The light that has entered the region Df reaches the position indicated by L2Df.

An optical head device with the above-described configuration can detect various signals in the following manner.

A tracking error signal is detected by the photodetector 194. When detecting the tracking error signal, one of two methods is used suitably depending on the type of the optical disk 105. In other words, a push-pull method is used for an optical disk with a continuous groove (for example, a recording/reproducing optical disk), while a phase difference method is used for an optical disk with pit-shaped track information (for example, a ROM disk).

When a signal output from each region of the photodetector 194 is expressed by the name of this region, a tracking error signal TE according to the push-pull method can be obtained by $$TE=(TEa+TEb)-(TEc+TEd). \quad (6)$$

The tracking error signal TE according to the phase difference method can be obtained by phase comparison of (TEa+TEc) and (TEb+TEd).

A focus error signal FE is detected by the photodetector 193. When a signal output from each region of the photodetector 193 is expressed by the name of this region, the focus error signal FE can be obtained by $$FE=(FE1+FE3)-(FE2+FE4). \quad (7)$$

The FE signal has an offset owing to a spot shift accompanied with a change in emission wavelength of the semiconductor laser 101.

In the optical head device with this configuration, the data signal is detected only with a signal from the photodetector 195. The light (L3) for detecting the data signal converges onto the photodetector 195, and its spot is smaller than that of the light (L1, L2) for detecting the servo error signals. Thus, the light-receiving area in the photodetector 195 can be reduced, resulting in a smaller capacitance of the photodetector. Consequently, it is possible to achieve excellent frequency characteristics, so that the data signal can be reproduced at a high speed.

Moreover, since the light-receiving area is small, the optical head device is not easily affected by stray light. Thus, even in a system with much stray light (for example, a system for reproducing information from an optical disk with many layers in which the information is recorded), an excellent reproduction signal can be obtained.

(Second Embodiment)

Figure 6:
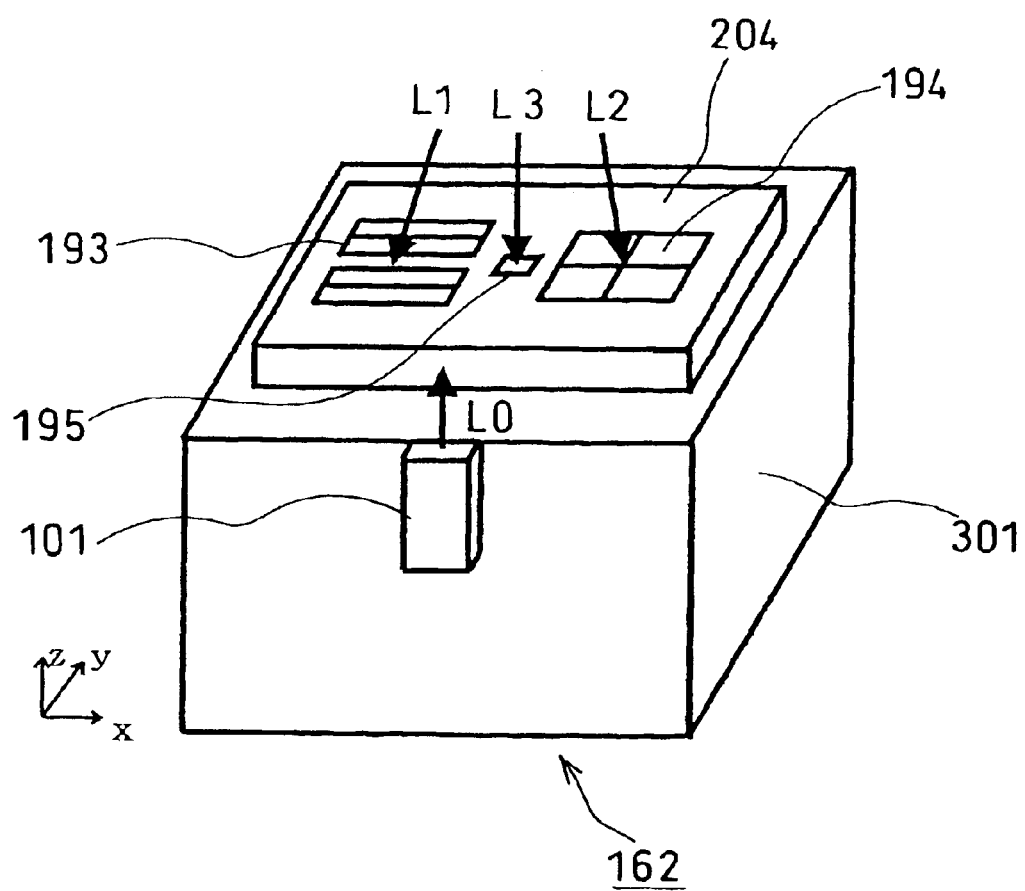
FIG. 6 is a perspective view showing a configuration of an LD-PD unit according to a second embodiment.

In the optical head device having the configuration of the first embodiment as shown in FIG. 1, the LD-PD unit 161 can be replaced with an LD-PD unit 162 with a configuration shown in FIG. 6. The silicon substrate 204 has a surface provided with the photodetectors 193, 194 and 195 and is fixed onto the upper surface of a holder 301 so that a normal vector of that surface corresponds to the z-axis direction. On one lateral surface of the holder 301 that is perpendicular to the upper surface, the semiconductor laser 101 further is fixed so that the direction of the emitted light L0 corresponds to the z-axis direction.

In this configuration, the light-emitting point of the semiconductor laser 101 and the optical axis (the z-axis direction) of the photodetector 195 are positioned far apart. Accordingly, if the diffraction optical system 118 described in the first embodiment is used as it is, the light L3 does not converge onto the photodetector 195.

Thus, the diffraction optical system 118 of FIG. 1 is allowed to have a lens effect in addition to the effect of bending the traveling direction of the incident light. This can be achieved by adopting a polarization anisotropic hologram element 181 that has a lens effect in the diffraction optical system 118 with the structure described in FIG. 3. In this manner, even in an LD-PD unit whose light emitting point and optical axis of the photodetector are apart, such as the LD-PD unit 162, it is possible to achieve an optical head device with effects similar to those in the first embodiment.

The present embodiment is directed to the case where the semiconductor laser 101 and the silicon substrate 204 are fixed directly to the holder 301. However, they do not have to be fixed directly, but may be fixed via a parallel plate such as a silicon substrate as long as they are fixed substantially.

(Third Embodiment)

Figure 7:
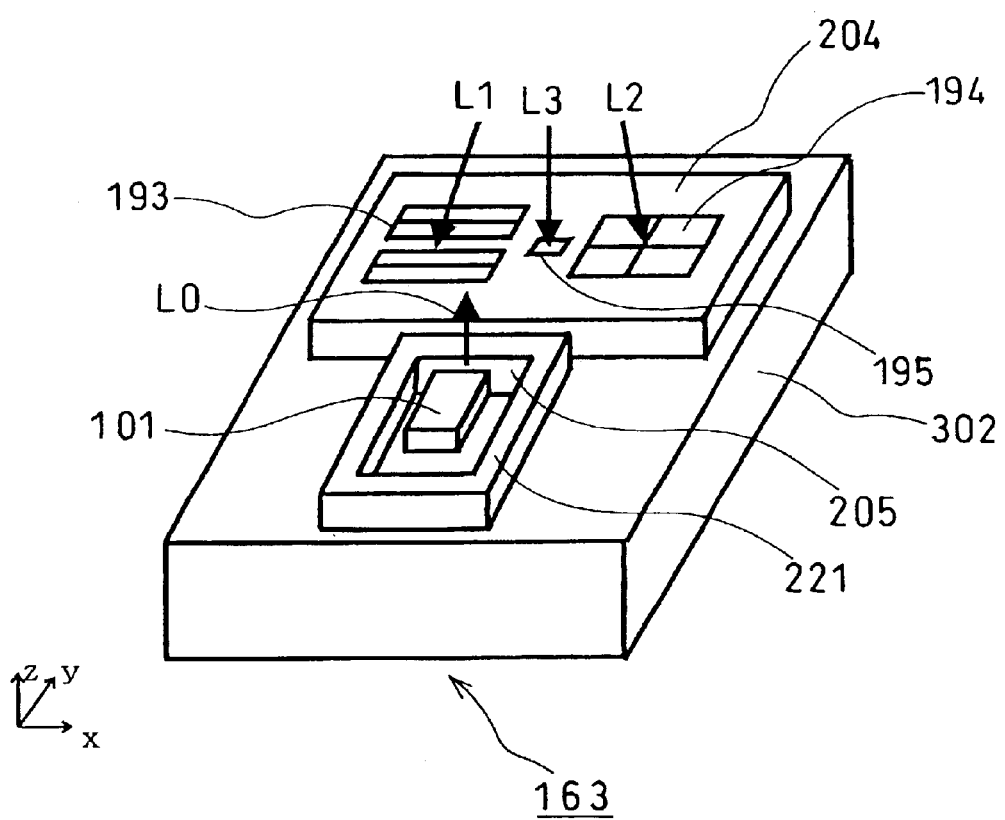
FIG. 7 is a perspective view showing a configuration of an LD-PD unit according to a third embodiment.

In the optical head device having the configuration of the first embodiment as shown in FIG. 1, the LD-PD unit 161 can be replaced with an LD-PD unit 163 with a configuration shown in FIG. 7. Similarly to the second embodiment, the silicon substrate 204 has a surface provided with the photodetectors 193, 194 and 195 and is fixed to a holder 302. The semiconductor laser 101 is fixed to a silicon substrate 221 on which the etched mirror 205 is formed. The silicon substrate 221 further is fixed to the holder 302 so that the direction of the emitted light L0 corresponds to the z-axis direction. Even in the LD-PD unit 163 described above, it is possible to achieve an optical head device with effects similar to those in the first embodiment.

(Fourth Embodiment)

Figure 8:
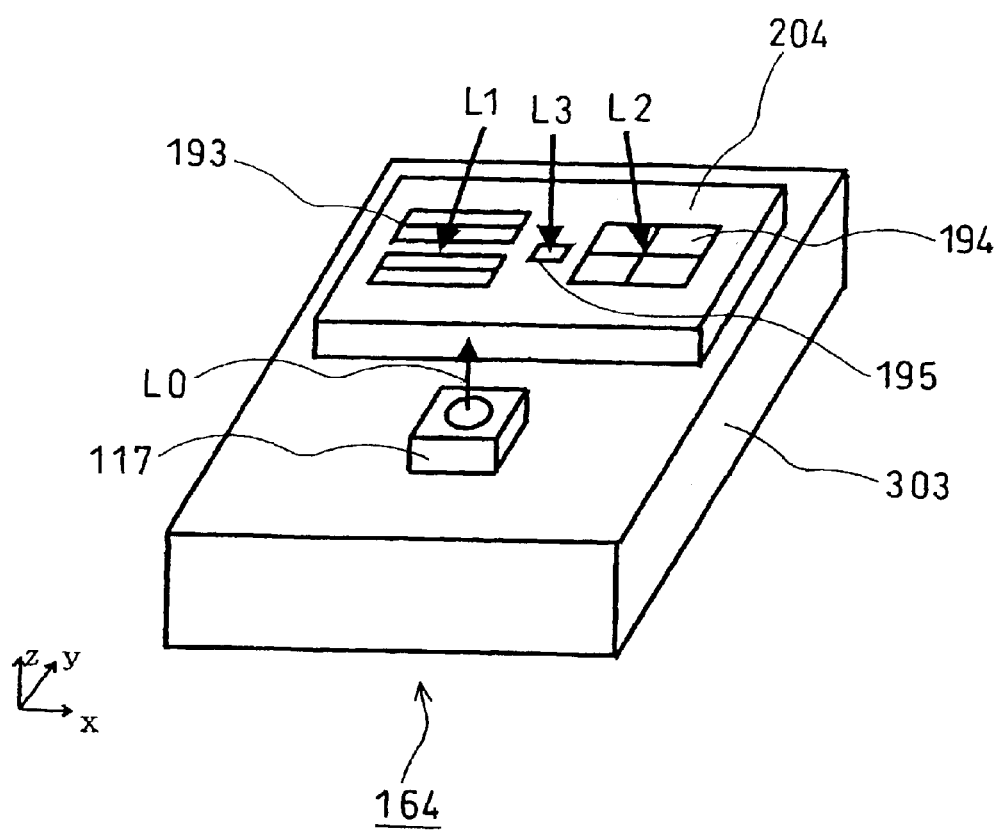
FIG. 8 is a perspective view showing a configuration of an LD-PD unit according to a fourth embodiment.

In the optical head device having the configuration of the first embodiment as shown in FIG. 1, the LD-PD unit 161 can be replaced with an LD-PD unit 164 with a configuration shown in FIG. 8. Similarly to the second embodiment, the silicon substrate 204 has a surface provided with the photodetectors 193, 194 and 195 and is fixed to a holder 303. Numeral 117 denotes a surface emitting laser, which is fixed so that the direction of the emitted light L0 corresponds to the z-axis direction. Even in the LD-PD unit 164 described above, it is possible to achieve an optical head device with effects similar to those in the first embodiment.

(Fifth Embodiment)

Figure 9:
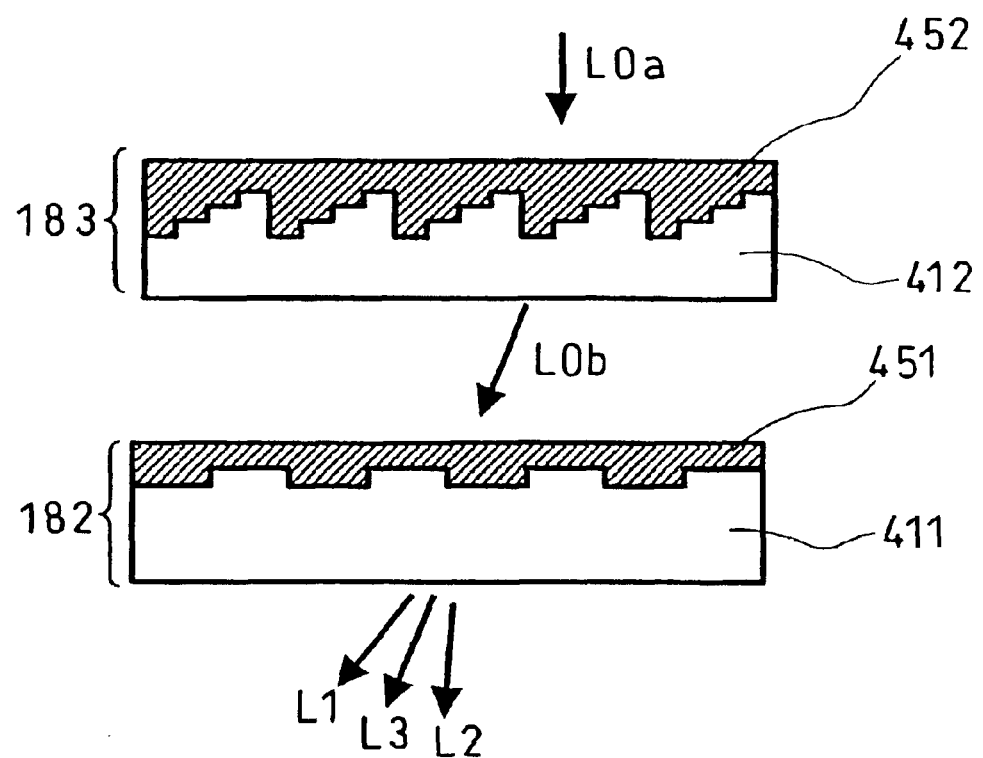
FIG. 9 is a sectional view showing a schematic structure of a diffraction optical system according to a fifth embodiment.

The diffraction optical system 118 shown in FIG. 1 also can be constituted using a blazed hologram that has a shape approximating that of the polarization anisotropic hologram element 181 shown in FIG. 3 in the first embodiment. FIG. 9 is a structural view showing a diffraction optical system according to the fifth embodiment. The hologram element 182 is the same as that in FIG. 3.

A polarization anisotropic hologram element 183 is obtained by changing the groove shape of the polarization anisotropic hologram element 181 of FIG. 3 from the sawtooth shape into a step-like shape. As in the polarization anisotropic hologram element 181, an isotropic substrate 412 and a birefringent material 452 are selected so that their refractive indexes in the x-axis direction of FIG. 1 match, and do not diffract light polarized in this direction.

When N represents the number of steps, it is possible to achieve maximal diffraction efficiency by setting the depth $d_s$ of one step of the step-like grooves to be $$d_s = \lambda/(N \cdot \Delta n). \qquad (8)$$

The diffraction efficiency improves as N becomes larger, and achieves 80% when N=4.

The polarization anisotropic hologram element 183 can be produced by a production process widely used for manufacturing semiconductors (for example, photolithography), and this makes mass production easy.

Although the diffraction efficiency is lower than that of the polarization anisotropic hologram element 181 used in the first embodiment, there is no practical problem if the value of N is set to be large as necessary. When the number N of steps on the surface is set to be the mth power of 2 where m is an integer ($2^m$), it is possible to produce the hologram element 183 by m etching processes, thereby realizing a hologram element having an excellent diffraction efficiency with fewer production processes. In this case, the depth $d_s$ of one step of the step-like grooves can be expressed by the following equation.

$$d_s = \lambda/(2^m \cdot \Delta n) \qquad (9)$$

Although the grooves formed on the polarization anisotropic hologram element 182 and those formed on the polarization anisotropic hologram element 183 are illustrated in the same direction (the direction toward the back of the sheet) in FIG. 9 for convenience, they are formed in different directions in practice.

In addition, the ¼ wave plate 115 also may be formed as one piece with the surface of the polarization anisotropic hologram element 183 or 182 that is facing away from the other, thereby simplifying the optical system.

(Sixth Embodiment)

Figure 10:
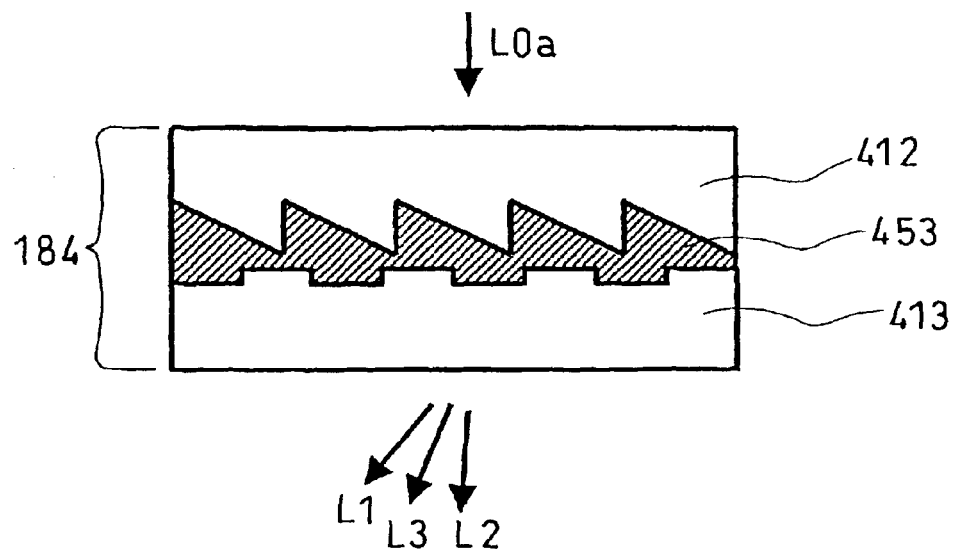
FIG. 10 is a sectional view showing schematically a polarization anisotropic hologram element according to a sixth embodiment.

The diffraction optical system 118 shown in FIG. 1 also can be constituted using a polarization anisotropic hologram element 184 shown in FIG. 10. Numerals 412 and 413 denote isotropic substrates having the same refractive index. The surface of the isotropic substrate 412 is provided with sawtooth grooves, while that of the isotropic substrate 413 is provided with grooves formed of protrusions and depressions. The isotropic substrates 412 and 413 are arranged so that their grooves face each other, between which a birefringent material 453 is filled.

The birefringent material 453 is selected so as to match its refractive index to the refractive indexes of the isotropic substrates 412 and 413 with respect to the x-axis direction of FIG. 1. This achieves an effect that light polarized in this direction is not diffracted. In addition, for the purpose of diffracting light polarized in the y-axis direction of FIG. 1 at maximal efficiency, the depth of the grooves of the isotropic substrate 412 is determined according to a birefringence amount of the birefringent material 453 so that light that has passed through the deepest portion of the groove and light that has passed through the shallowest portion thereof have a phase difference of 2π. Moreover, the groove depth of the isotropic substrate 413 is determined as described in the first embodiment, for achieving a predetermined diffraction efficiency.

As described above, the present embodiment makes it possible to achieve a polarization anisotropic hologram element that is applicable to the diffraction optical system 118.

Although the grooves formed on the isotropic substrate 412 and those formed on the isotropic substrate 413 are illustrated in the same direction (the direction toward the back of the sheet) in FIG. 10 for convenience, they are formed in different directions in practice. In addition, the ¼ wave plate 115 also may be formed as one piece with the surface of the polarization anisotropic hologram element 184, thereby simplifying the optical system.

(Seventh Embodiment)

Figure 11:
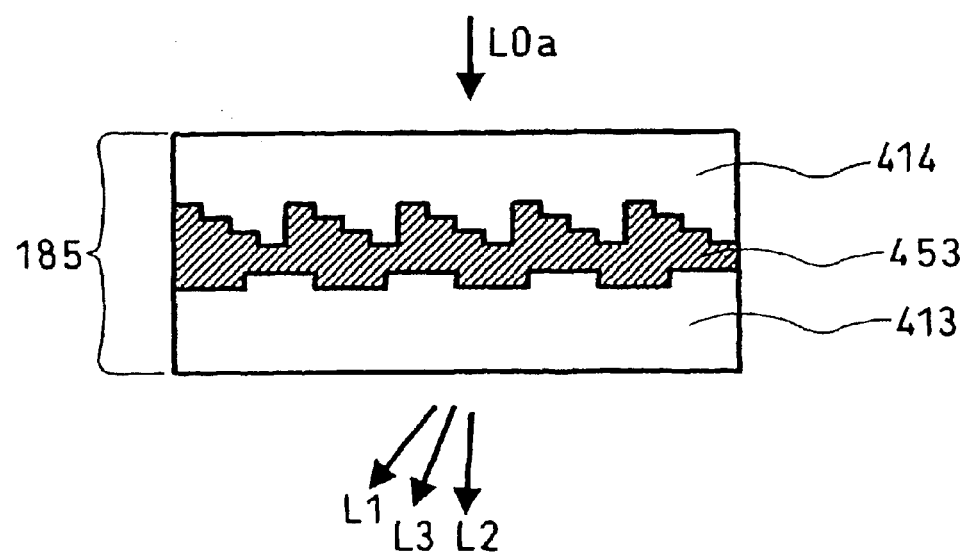
FIG. 11 is a sectional view showing schematically a polarization anisotropic hologram element according to a seventh embodiment.

The diffraction optical system 118 shown in FIG. 1 also can be constituted using a polarization anisotropic hologram element 185 shown in FIG. 11. The polarization anisotropic hologram element 185 is obtained by replacing the isotropic substrate 412 of the polarization anisotropic hologram element 184 shown in FIG. 10 with an isotropic substrate 414 having a step-like surface shape.

As in the fifth embodiment, this polarization anisotropic hologram element can be produced by a production process widely used for manufacturing semiconductors (for example, photolithography), and this makes mass production easy. Also in the present embodiment, when the number N of steps on the surface is set to be the mth power of 2 where m is an integer ($2^m$), it is possible to produce the hologram element 185 by m etching processes, thereby realizing a hologram element having an excellent diffraction efficiency with fewer production processes.

Although the grooves formed on the isotropic substrate 413 and those formed on the isotropic substrate 414 are illustrated in the same direction (the direction toward the back of the sheet) in FIG. 11 for convenience, they are formed in different directions in practice. In addition, the ¼ wave plate 115 also may be formed as one piece with the surface of the polarization anisotropic hologram element 185, thereby simplifying the optical system.

As described above, the present embodiment makes it possible to achieve a polarization anisotropic hologram element that is applicable to the diffraction optical system 118.

(Eighth Embodiment)

Figure 12A:
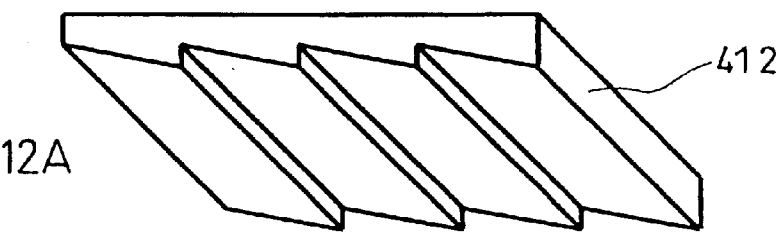
FIGS. 12A, 12B and 12C are perspective views for describing a structure of a polarization anisotropic hologram element according to an eighth embodiment.
Figure 12B:
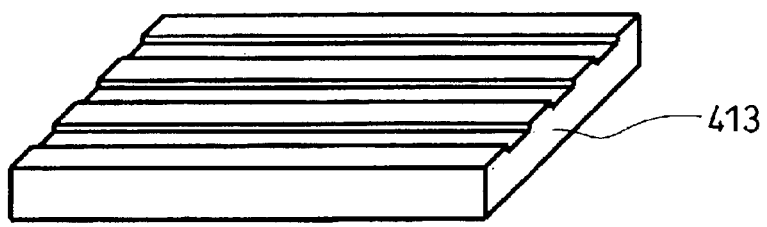
Figure 12C:
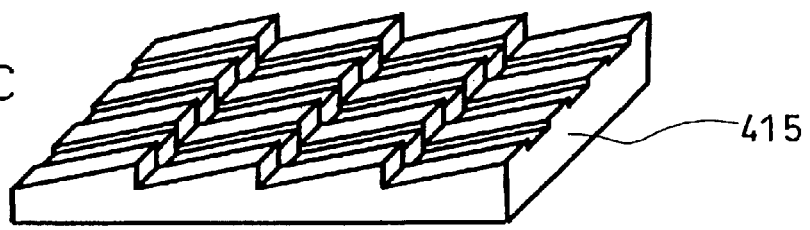

The eighth embodiment will be described with reference to FIGS. 12A, 12B, 12C and 13. FIG. 12A is a perspective view showing the isotropic substrate 412 used in the sixth embodiment, and FIG. 12B is a perspective view showing the isotropic substrate 413 used in the sixth embodiment. Further, FIG. 12C is a perspective view showing an isotropic substrate 415 used in the eighth embodiment.

The shape function $d_1(x, y)$ of the isotropic substrate 412 and the shape function $d_2(x, y)$ of the isotropic substrate 413 are determined as described in the sixth embodiment, while the shape function $d_0(x, y)$ of the isotropic substrate 415 is determined as a composite of $d_1(x, y)$ and $d_2(x, y)$. In other words, it is determined by $$d_0(x, y) = d_1(x, y) + d_2(x, y). \tag{10}$$

Figure 13:
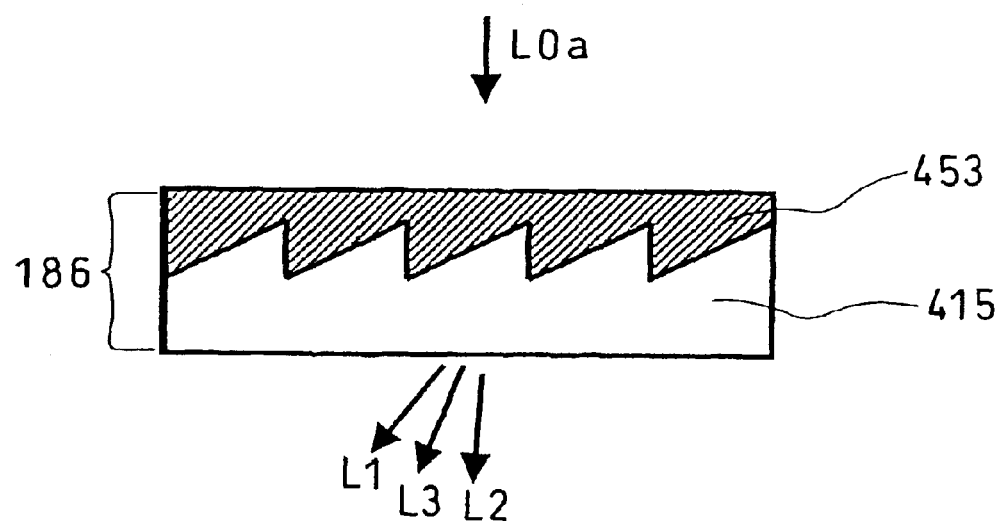
FIG. 13 is a sectional view showing schematically a polarization anisotropic hologram element according to the eighth embodiment.

FIG. 13 illustrates a structure of a polarization anisotropic hologram element 186 based on the present embodiment. The isotropic substrate 415 shown in FIG. 12C is filled with the birefringent material 453 used in the sixth embodiment, thus forming the diffraction optical system 118.

In other words, from incident light L0a, the polarization anisotropic hologram element 186 can generate diffraction light L3 as well as diffraction light L1 and its complex conjugate wave, i.e., diffraction light L2. The diffraction light L1 and the diffraction light L2 are not higher order diffraction lights accompanied with the diffraction light L3, but diffraction lights independent of the diffraction light L3.

The present embodiment makes it possible to achieve an optical system with a simpler structure and a lower cost compared with those of the sixth and seventh embodiments.

Although the case based on the shape of the sixth embodiment has been described here, there is no particular limitation to this. For example, the similar effects also can be obtained in the case of replacing the isotropic substrate 412 with the isotropic substrate 414 used in the seventh embodiment. In addition, the ¼ wave plate 115 also may be formed as one piece with the surface of the polarization anisotropic hologram element 186, thereby simplifying the optical system.

(Ninth Embodiment)

Figure 14A:
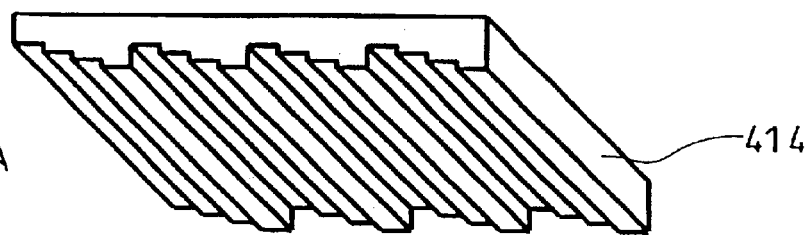
FIGS. 14A, 14B and 14C are perspective views for describing a structure of a polarization anisotropic hologram element according to a ninth embodiment.
Figure 14B:
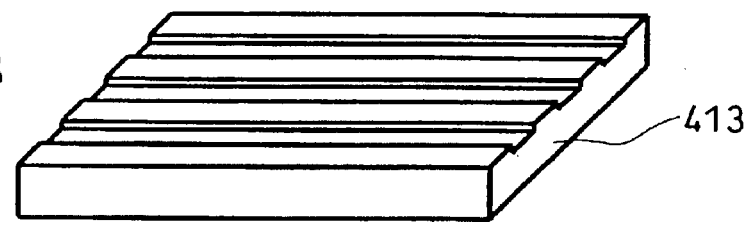
Figure 14C:
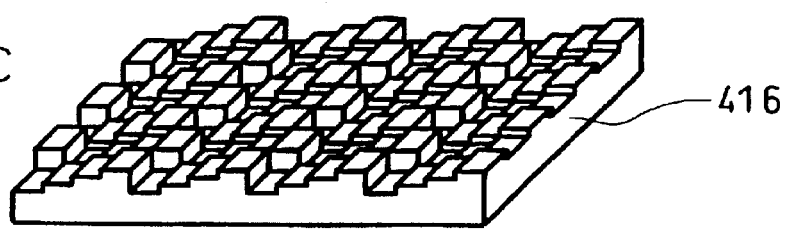

In the following, the ninth embodiment will be described with reference to FIGS. 14A, 14B, 14C and 15. FIG. 14A is a perspective view showing the isotropic substrate 414 shown in FIG. 11 used in the seventh embodiment, and FIG. 14B is a perspective view showing the isotropic substrate 413 used in the seventh embodiment. Further, FIG. 14C is a perspective view showing an isotropic substrate 416 used in the ninth embodiment.

The shape function $d_1(x, y)$ of the isotropic substrate 414 and the shape function $d_2(x, y)$ of the isotropic substrate 413 are determined as described in the seventh embodiment, while the shape function $d_0(x, y)$ of the isotropic substrate 416 is determined as a composite of $d_1(x, y)$ and $d_2(x, y)$. In other words, it is determined by $$d_0(x, y) = \mathrm{mod}(d_1(x, y) + d_2(x, y), \lambda/\Delta n), \tag{11}$$

wherein mod(A, B) is defined as a function representing the remainder obtained by dividing A by B, Δn is a difference in the refractive indexes with respect to light polarized in the y-axis direction between the isotropic substrate 416 and the birefringent material 453, and λ is a wavelength of the light source.

Figure 15:
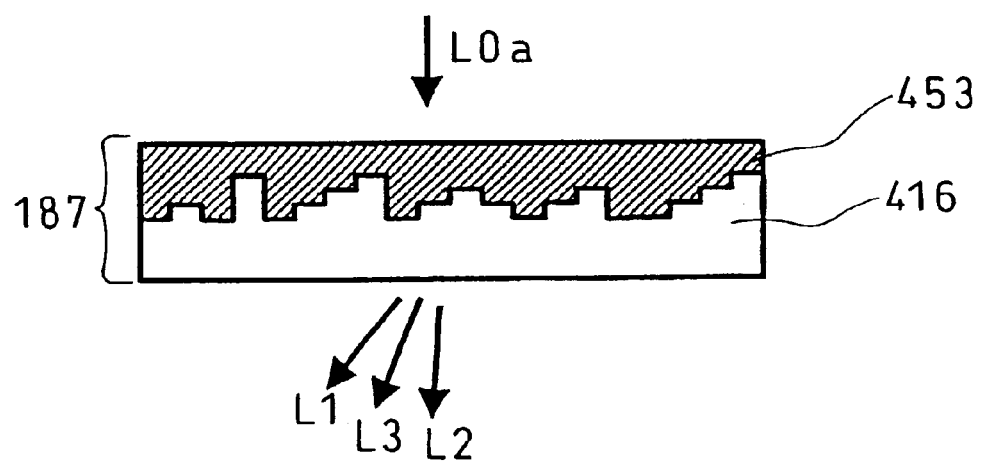
FIG. 15 is a sectional view showing schematically a polarization anisotropic hologram element according to the ninth embodiment.

FIG. 15 illustrates a structure of a polarization anisotropic hologram element 187 based on the present embodiment. This hologram element is formed by filling the isotropic substrate 416 shown in FIG. 14C with the birefringent material 453.

The present embodiment can constitute a polarization anisotropic hologram element by a substrate with shallower grooves than that in the eighth embodiment, allowing easier production.

Although the case based on the shape of the seventh embodiment has been described here, there is no particular limitation to this. For example, it is possible to achieve a polarization anisotropic hologram element even in the case of replacing the isotropic substrate 414 with the isotropic substrate 412 used in the sixth embodiment.

Furthermore, in the case where the surface shape expressed by the shape function $d_1$ is step-like, a polarization anisotropic hologram element can be produced with simpler processes by selecting the shape functions $d_1$ and $d_2$ suitably. In other words, when the groove depth according to the shape function $d_2$ is set to be the depth of one step according to the shape function $d_1$, the surface shape according to the shape function $d_0$ has the equal number N of steps to the surface shape according to the shape function $d_1$, so that the isotropic substrate 416 can be produced by the same process as for the isotropic substrate 414.

Moreover, when the number N of steps according to the shape function $d_1$ is set to be the mth power of 2 where m is an integer ($2^m$), it is possible to produce the hologram element by m etching processes. Taking the case of N=4 for example, it is appropriate that the groove depth according to the shape function $d_2$ is set equal to the depth of one step according to the shape function $d_1$, and the efficiency at this time is equal to that of the optical system described in the fifth embodiment.

As described above, the present embodiment makes it possible to achieve a polarization anisotropic hologram element that is applicable to the diffraction optical system 118 and produced by simple processes. In addition, the ¼ wave plate 115 also may be formed as one piece with the surface of the polarization anisotropic hologram element 187, thereby simplifying the optical system.

(Tenth Embodiment)

Figure 16:
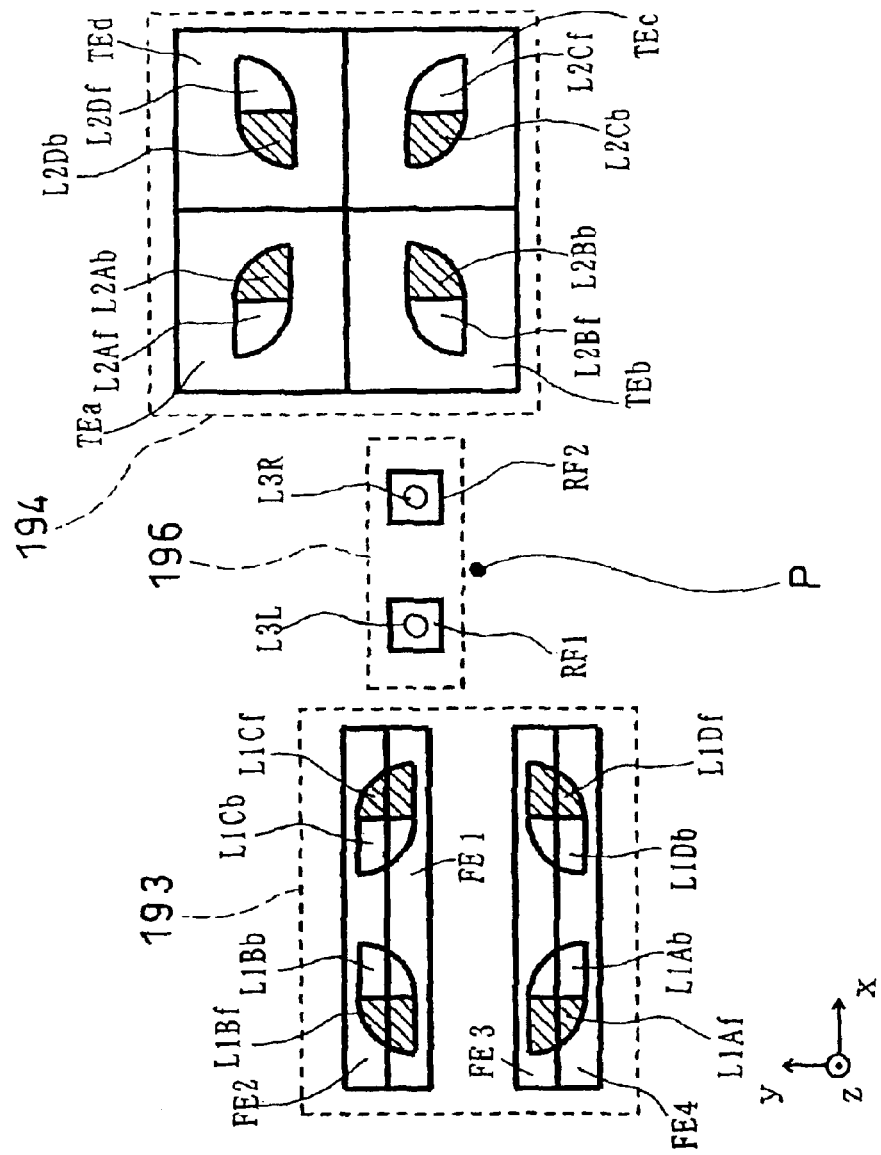
FIG. 16 is a plan view showing schematically shapes of light-receiving elements and a position of a light-emitting point according to a tenth embodiment.
Figure 17:
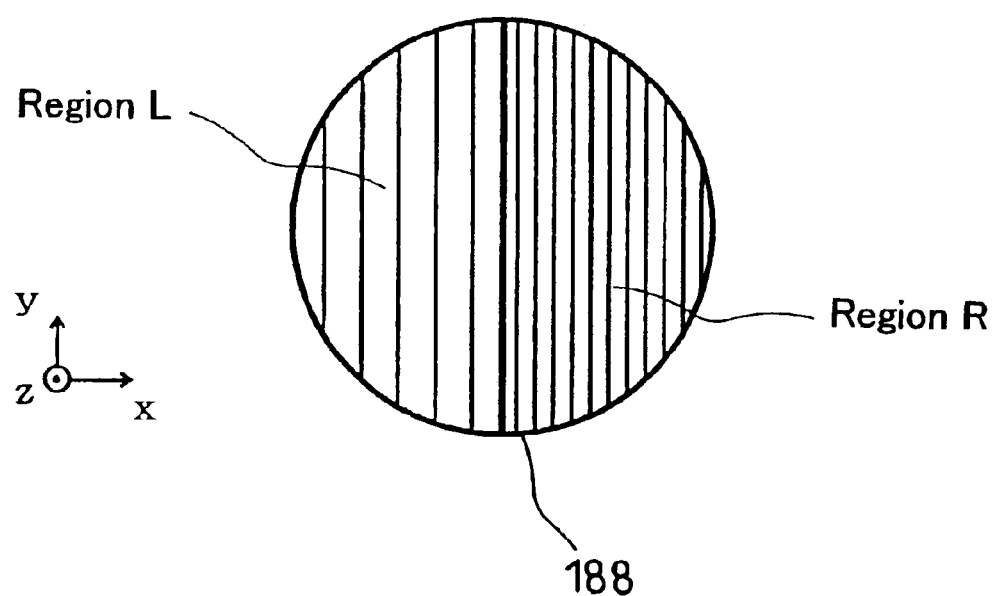
FIG. 17 is a plan view showing schematically a polarization anisotropic hologram element according to the tenth embodiment.

An optical head device according to the tenth embodiment is constituted using a photodetector 196 shown in FIG. 16 instead of the photodetector 195 on the LD-PD unit 161 shown in FIG. 2 of the optical head device according to the first embodiment. The photodetector 196 has two regions (RF1, RF2). The groove shapes of polarization anisotropic hologram elements 188 and 189 shown in FIGS. 17 and 18, which correspond to the polarization anisotropic hologram elements 181 and 182 in FIG. 3, are determined in the following manner.

The polarization anisotropic hologram element 188 has two regions (region L, region R) that have different groove shapes. The two regions are both designed so as to diffract light polarized in the y-axis direction at maximal efficiency, like the polarization anisotropic hologram element 181. The groove shape in the region L is determined so that incident light polarized in the y-axis direction is converted to diffraction light reaching RF1 of the photodetector 196. Also, the groove shape in the region R is determined so that incident light polarized in the y-axis direction is converted to diffraction light reaching RF2 of the photodetector 196.

Figure 18:
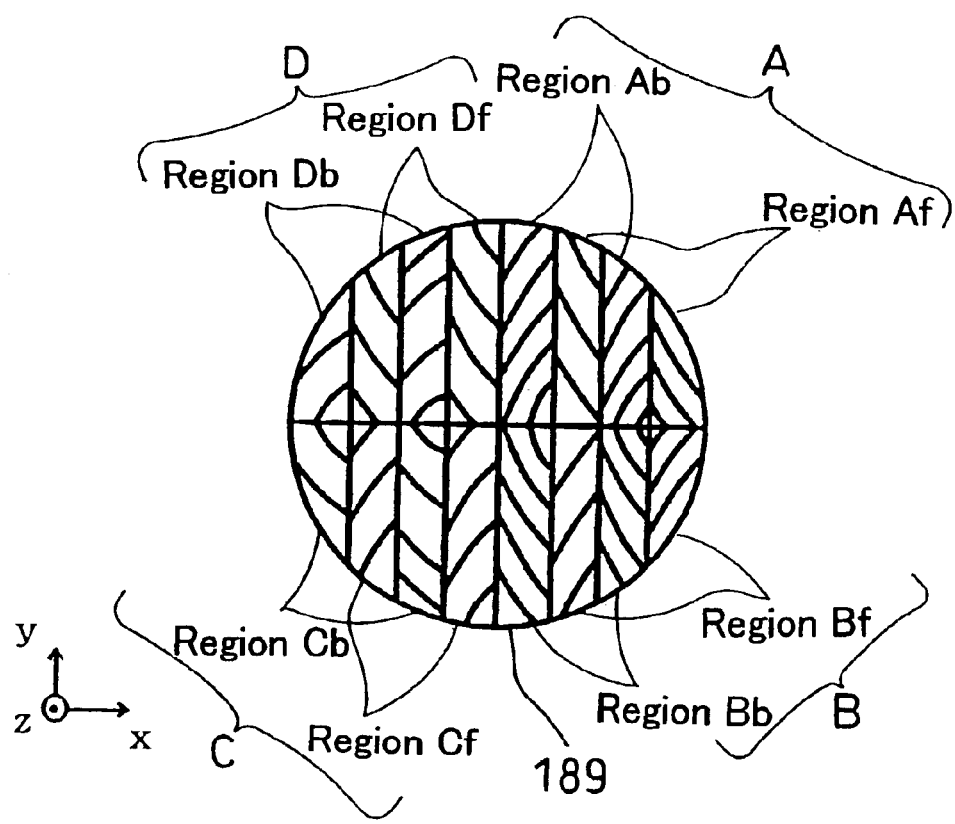
FIG. 18 is a plan view showing schematically a polarization anisotropic hologram element according to the tenth embodiment.

The polarization anisotropic hologram element 189 shown in FIG. 18 is divided as in the polarization anisotropic hologram element 182 shown in FIG. 4 in the first embodiment. Each region of the polarization anisotropic hologram element 189 is designed so as to function in the following manner when the smallest light spot is formed on a recording surface of the optical disk 105 (in a focused state).

Light beams diffracted by the regions L and R of the polarization anisotropic hologram element 188 (FIG. 17) enter respective regions in the polarization anisotropic hologram element 189 (FIG. 18), so that +1-order diffraction light L1 and −1-order diffraction light L2 are generated. The +1-order diffraction light L1 reaches its respective position in the photodetectors 193 and 194 shown in FIG. 16 as follows.

The light that has been diffracted by the region R (FIG. 17) and entered the region Ab (FIG. 18) reaches the position indicated by L1Ab in the photodetector 193 so as to converge on a back side (at the position with a smaller z coordinate) with respect to the photodetector 193. The light that has been diffracted by the region R and entered the region Af reaches the position indicated by L1Af in the photodetector 193 so as to converge on a front side (at the position with a larger z coordinate) with respect to the photodetector 193.

The light that has been diffracted by the region R and entered the region Bb reaches the position indicated by L1Bb in the photodetector 193 so as to converge on the back side (at the position with a smaller z coordinate) with respect to the photodetector 193. The light that has been diffracted by the region R and entered the region Bf reaches the position indicated by L1Bf in the photodetector 193 so as to converge on the front side (at the position with a larger z coordinate) with respect to the photodetector 193.

The light that has been diffracted by the region L and entered the region Cb reaches the position indicated by L1Cb in the photodetector 193 so as to converge on the back side (at the position with a smaller z coordinate) with respect to the photodetector 193. The light that has been diffracted by the region L and entered the region Cf reaches the position indicated by L1Cf in the photodetector 193 so as to converge on the front side (at the position with a larger z coordinate) with respect to the photodetector 193.

The light that has been diffracted by the region L and entered the region Db reaches the position indicated by L1Db in the photodetector 193 so as to converge on the back side (at the position with a smaller z coordinate) with respect to the photodetector 193. The light that has been diffracted by the region L and entered the region Df reaches the position indicated by L1Df in the photodetector 193 so as to converge on the front side (at the position with a larger z coordinate) with respect to the photodetector 193.

Next, the −1-order diffraction light L2 that is generated by the polarization anisotropic hologram element 189 enters the following position in the photodetector 194.

The light that has entered the region Ab reaches the position indicated by L2Ab. The light that has entered the region Af reaches the position indicated by L2Af.

The light that has entered the region Bb reaches the position indicated by L2Bb. The light that has entered the region Bf reaches the position indicated by L2Bf.

The light that has entered the region Cb reaches the position indicated by L2Cb. The light that has entered the region Cf reaches the position indicated by L2Cf.

The light that has entered the region Db reaches the position indicated by L2Db. The light that has entered the region Df reaches the position indicated by L2Df.

Light L3L and light L3R, which have entered the regions L and R respectively in the polarization anisotropic hologram element 188 and been transmitted without being diffracted by the polarization anisotropic hologram element 189, are focused on light-receiving regions RF1 and RF2 respectively in the photodetector 196.

The optical head device according to the present embodiment can detect signals even in a system in which an information signal such as an address is recorded by positions on the right and left of a groove.

Although the present embodiment is directed to the case of modifying a detection region of the LD-PD unit 161 used in the first embodiment, there is no particular limitation as long as the light-receiving elements and the light-emitting element are arranged close to each other and two light beams for data signals can be detected. For example, it also may be possible to achieve a configuration in which the light-receiving elements in the LD-PD units in the second to fourth embodiments are modified.

(Eleventh Embodiment)

Figure 19:
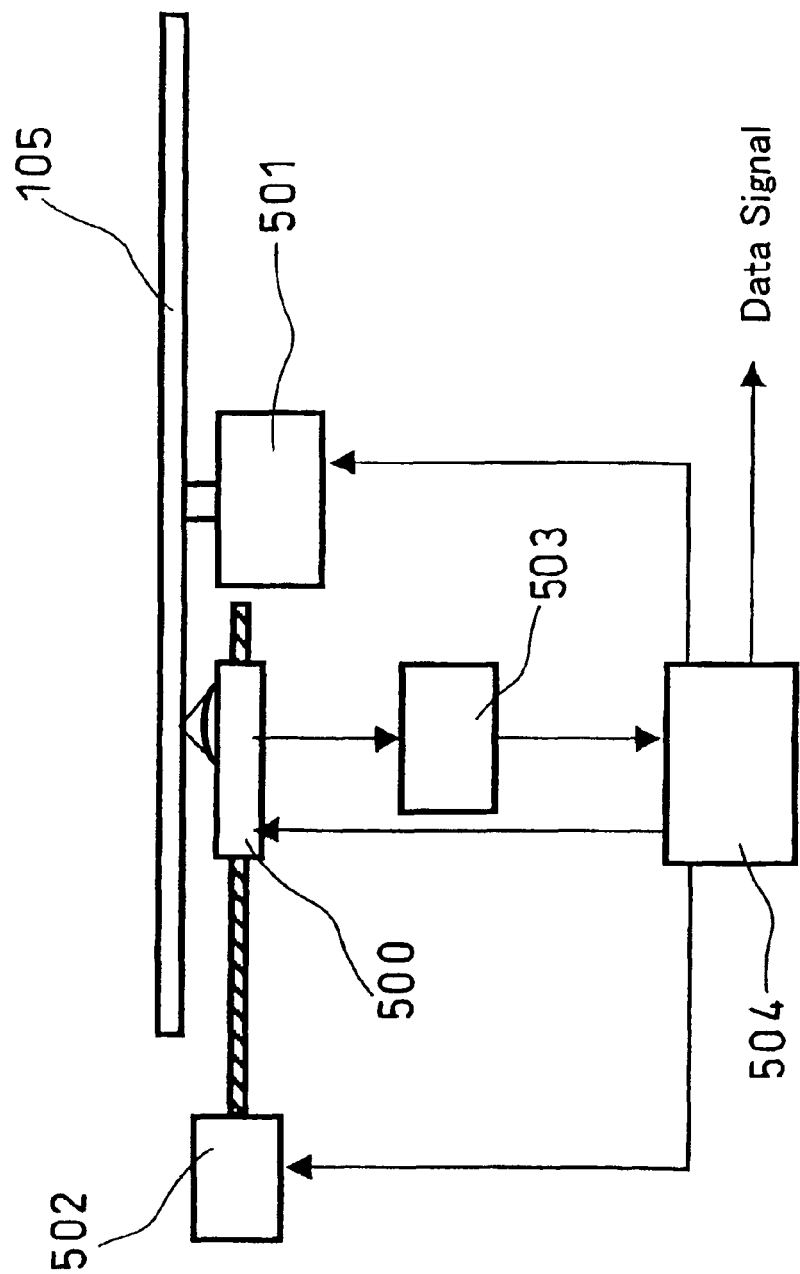
FIG. 19 is a structural view of an optical information processing apparatus according to an eleventh embodiment.

FIG. 19 illustrates an optical information processing apparatus according to the eleventh embodiment of the present invention. The present embodiment will be directed to the optical information processing apparatus using the optical head device of the first embodiment, but it also is possible to constitute an optical information processing apparatus in a similar manner using the optical head devices of the other embodiments.

In FIG. 19, the optical disk 105 is rotated by an optical disk rotating mechanism 501. An optical head device 500 is driven to a track having desired information in the optical disk 105 by an optical head device driving device 502. Signals detected from the light-receiving regions of the optical head device 500 are current/voltage converted and amplified by a head amplifier 503, then input to an electric circuit 504.

The electric circuit 504 calculates the input signals to obtain a servo error signal, and then transmits to the optical head device 500 a signal for moving the objective lens slightly. With this signal, the optical head device 500 performs a focus servo and a tracking servo with respect to the optical disk 105 and reads out, writes in or erase a data signal with respect to the optical disk 105.

Figure 20:
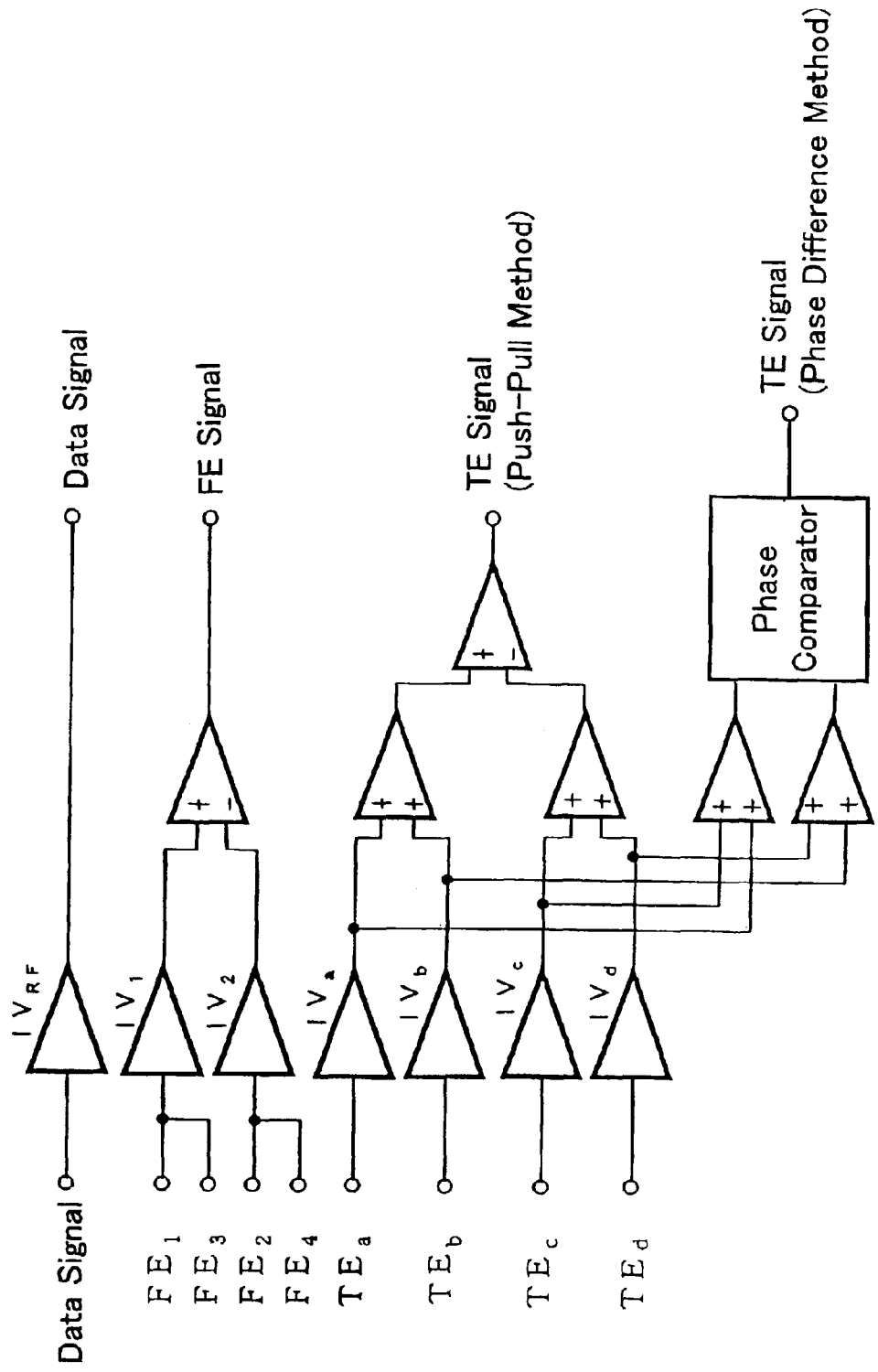
FIG. 20 is a circuit diagram showing a partial configuration of head amplifiers and electric circuits according to the eleventh embodiment.
Figure 21:
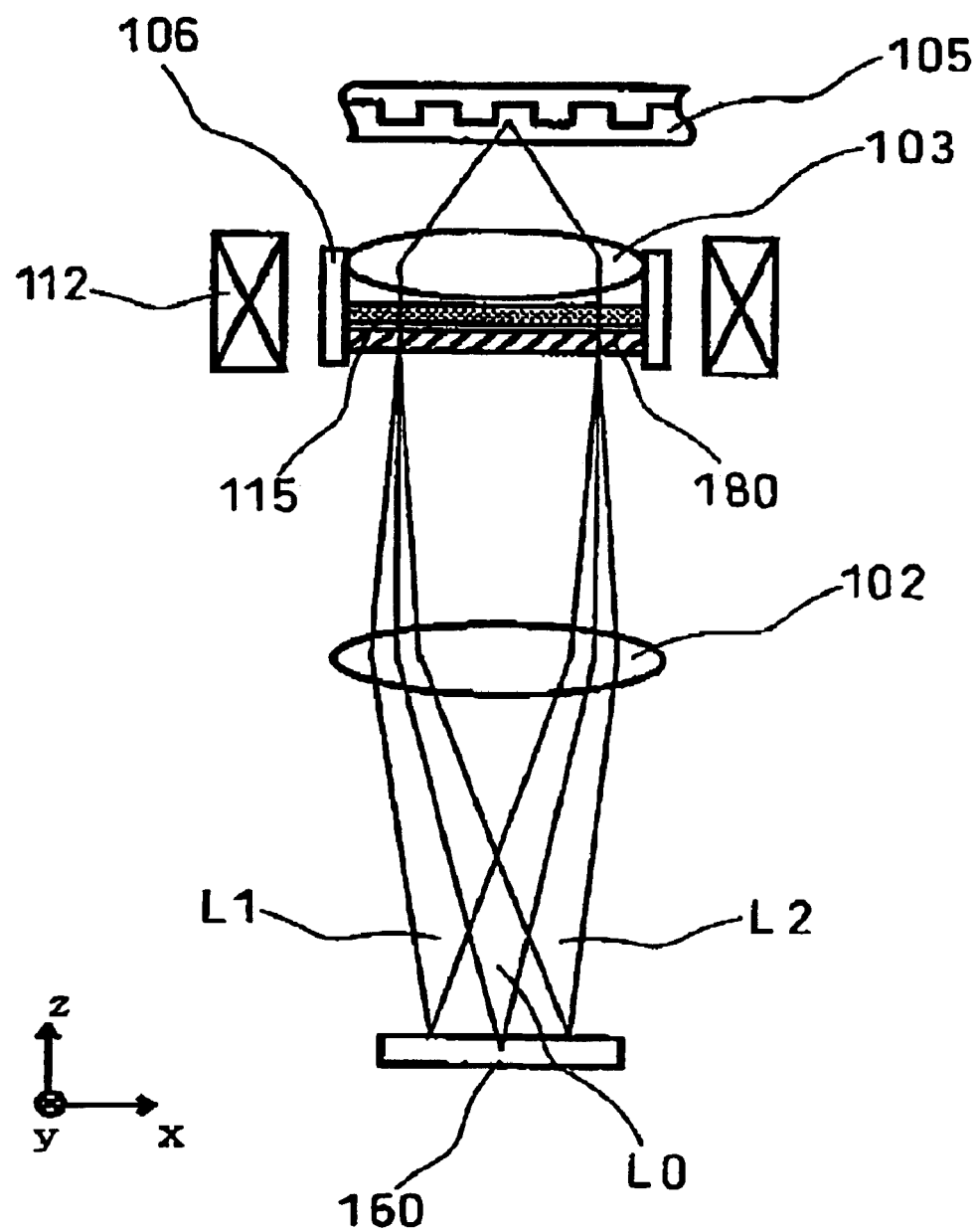
FIG. 21 is a sectional view showing a schematic configuration of a conventional optical head device.
Figure 22:
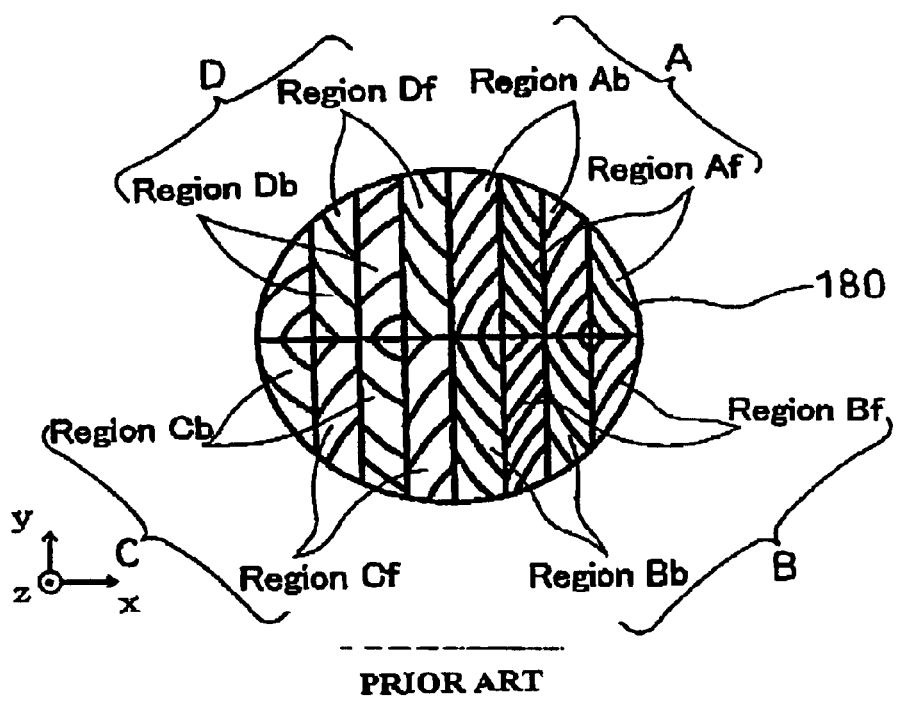
FIG. 22 is a plan view showing schematically a conventional polarization anisotropic hologram.
Figure 23:
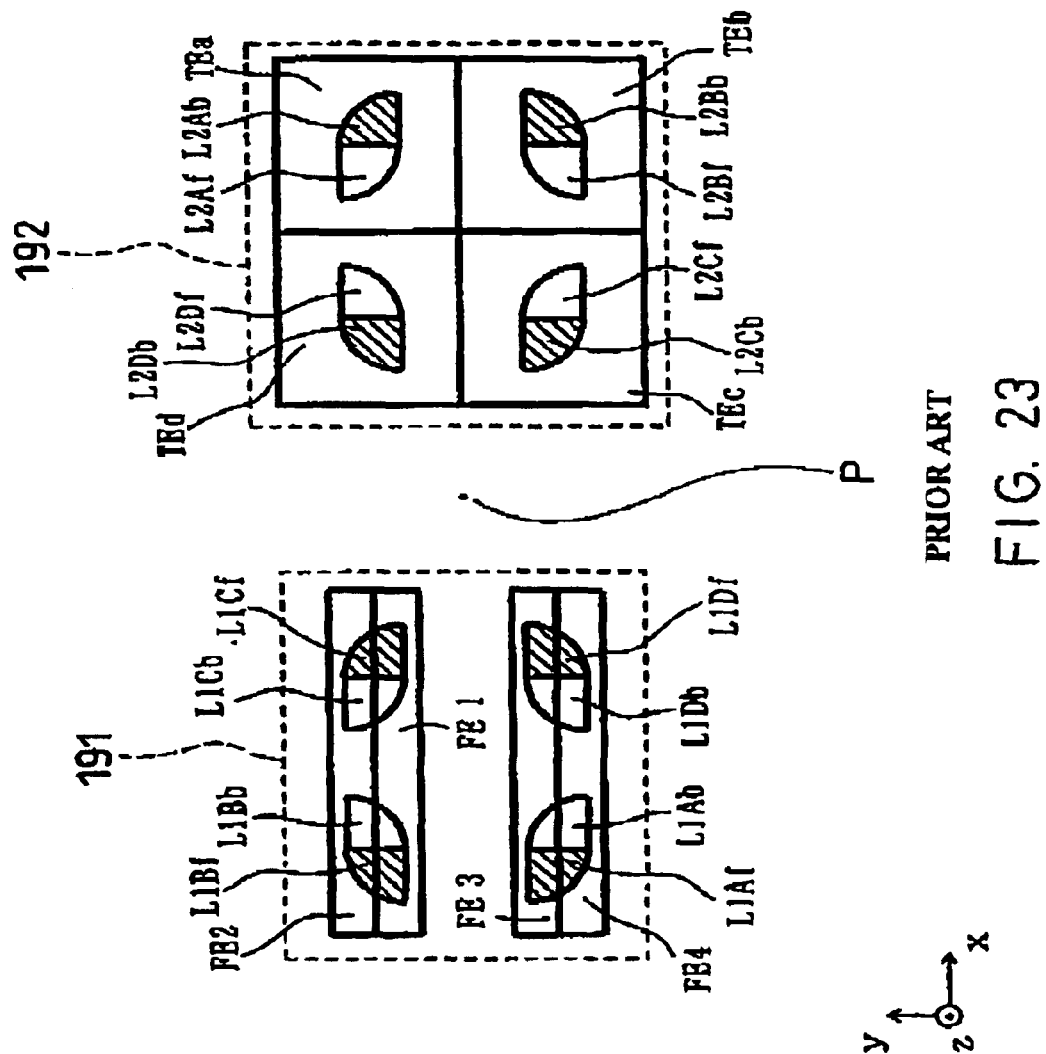
FIG. 23 is a plan view showing a schematic configuration of a conventional LD-PD unit.

FIG. 20 is a circuit diagram showing the head amplifier 503 and a part of the electric circuit 504. In order to detect the data signal, a data signal from the photodetector 195 is current/voltage converted by a circuit $IV_{RF}$. Since a servo error signal need not be detected from this signal, a circuit configuration with a limited bandwidth can be used, making it easier to achieve a circuit having a simple configuration and low noise level. Conventionally, since the data signal was obtained by totaling all the signals from the amplifiers in 6 channels, an amplifier noise was added in as well. On the other hand, since an amplifier noise of only 1 channel is mixed in according to the present invention, it is possible to suppress the noise down to $\frac{1}{6}^{0.5}$ of the conventional level. When using the optical head device illustrated in the tenth embodiment, it is appropriate to add one more circuit that is similar to the circuit $IV_{RF}$.

With respect to signals from the regions (FE1, FE2, FE3, FE4) in the photodetector 193, for the purpose of detecting a focus error (FE) signal, FE1 and FE3 on the one hand and FE2 and FE4 on the other hand are connected, and the former is current/voltage converted by a circuit $IV_1$ and the latter is current/voltage converted by a circuit $IV_2$, thus obtaining the focus error signal from the difference in their outputs. Since the amplifier used in this circuit system does not detect the data signal, it may be operated in a servo bandwidth at relatively low frequencies, thus achieving a low-current amplifier with a simple configuration.

For the purpose of detecting a tracking error (TE) signal, signals from the regions (TEa, TEb, TEc, TEd) in the photodetector 194 are current/voltage converted by circuits $IV_a$, $IV_b$, $IV_c$, $IV_d$, respectively.

In order to obtain a tracking servo signal by the push-pull method, it is appropriate to add the outputs of the circuits $IV_a$ and $IV_b$, add the outputs of the circuits $IV_c$ and $IV_d$, and then obtain the difference between them. In order to obtain a tracking servo signal by the phase difference method, it is appropriate to add the outputs of the circuits $IV_a$ and $IV_c$, add the outputs of the circuits $IV_b$ and $IV_d$, and then compare the phases of these output signals.

The used frequency band of the amplifier varies depending on the detection method of the servo error signal. A servo frequency band alone is suitable for detecting only a push-pull signal, while a signal frequency band alone is suitable for detecting only a phase difference signal. When switching the two systems for use, it is necessary to use the entire frequency band. In any case, since a noise influence is not as large as that in the case of reproducing a data signal, the circuits may be simple.

According to the above configuration, it is possible to achieve an optical information processing apparatus that can reproduce a data signal at a high speed and obtain an excellent reproduction signal even in a system with much stray light.

Although the description of the present embodiment is directed to the case of providing the head amplifier 503 and a part of the electric circuit 504 independently of the optical head device, there is no particular limitation to this. It also may be possible to mount all or a part of them inside the optical head device 500 or to provide them on the substrate of the light-receiving element.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical element, transmitting a light beam polarized in a first direction, and bending a traveling direction of light beam polarized in a second direction that is perpendicular to the first direction and diffracting the light beam polarized in a second direction, wherein the optical element generates a first diffraction light beam obtained by bending the traveling direction of an incident light beam polarized in the second direction and a second diffraction light beam, which is a +1-order diffraction light beam or a −1-order diffraction beam with respect to the first diffraction light beam comprising:

a first diffraction element system for transmitting the light beam polarized in the first direction and diffracting all the light beam polarized in the second direction, and a second diffraction element for transmitting the light beam polarized in the first direction and diffracting the light beam polarized in the second direction at a predetermined efficiency, wherein the first diffraction element comprises a first light-transmitting material and a second light-transmitting material, a refractive index of the light-transmitting material and a refractive index of the second light-transmitting material are equal for the light beam polarized in the first direction and different for the light beam polarized in the second direction, an interface between the first light-transmitting material and the second light-transmitting material has a saw-tooth groove shape, the second diffraction element comprises a third light-transmitting material and a fourth light-transmitting material, a refractive index of the third light-transmitting material and a refractive index of the fourth light-transmitting material are equal for the light beam polarized in the first direction and different for the light beam polarized in the second direction, an interface between the third light-transmitting material and the fourth light-transmitting material has a groove shape formed of periodic protrusions and depressions, and the first diffraction element and the second diffraction element are fixed to each other in a predetermined relative positional relationship.

2. An optical element, transmitting a light beam polarized in a first direction, and bending a traveling direction of a light beam polarized in a second direction that is perpendicular to the first direction and diffracting the light beam polarized in the second direction,
- wherein the optical element generates a first diffraction light beam obtained by bending the traveling direction of an incident light beam polarized in the second direction and a second diffraction light beam, which is a +1-order diffraction light beam or a −1-order diffraction beam with respect to the first diffraction light beam comprising:
- a first diffraction element for transmitting the light beam polarized in the first direction and diffracting all the light beam polarized in the second direction, and
- a second diffraction element for transmitting the light beam polarized in the first direction and diffracting the light beam polarized in the second direction at a predetermined efficiency,
- wherein the first diffraction element comprises a first light-transmitting material and a second light-transmitting material,
- a refractive index of the first light-transmitting material and a refractive index of the second light-transmitting material are equal for the light beam polarized in the first direction and different for the light bean polarized in the second direction,
- an interface between the first light-transmitting material and the second light-transmitting material has a step-like shape,
- the second diffraction element comprises a third light-transmitting material and a fourth light-transmitting material,
- a refractive index of the third light-transmitting material and a refractive index of the fourth light-transmitting material are equal for the light beam polarized in the first direction and different for the light beam polarized in the second direction,
- an interface between the third light-transmitting material and the fourth light-transmitting material has a groove shape formed of periodic protrusion and depressions, and
- the first diffraction element and the second diffraction element are fixed to each other in a predetermined relative positional relationship.

3. An optical element, transmitting a light beam polarized in a first direction, and bending a traveling direction of a light beam polarized in a second direction that is perpendicular to the first direction and diffracting the light beam polarized in the second direction,
- wherein the optical element generates a first diffraction light beam obtained by bending the traveling direction of an incident light beam polarized in the second direction and a second diffraction light beam, which is a +1-order diffraction light beam or a −1-order diffraction beam with respect to the first diffraction light beam comprising:
- a first-light transmitting material, a second light-transmitting material and a third light-transmitting material,
- wherein the first light-transmitting material and the second light-transmitting material are adjacent to each other via a first interface,
- the second light-transmitting material and the third light-transmitting material are adjacent to each other via a second interface,
- a refractive index of the first light-transmitting material and a refractive index of the second light-transmitting material are equal for the light beam polarized in the first direction and different for the light beam polarized in the second direction,
- a refractive index of the second light-transmitting material and a refractive index of the third light-transmitting material are equal for the light beam polarized in the first direction and different for the light beam polarized in the second direction,
- the first interface has a sawtooth groove shape, and
- the second interface has a groove shape formed of periodic protrusions and depressions.

4. An optical element, transmitting a light beam polarized in a first direction, and bending a traveling direction of a light beam polarized in a second direction that is perpendicular to the first direction and diffracting the light beam polarized in the second direction,
- wherein the optical element generates a first diffraction light beam obtained by bending the traveling direction of an incident light beam polarized in the second direction and a second diffraction light beam, which is a +1-order diffraction light beam or a −1-order diffraction beam with respect to the first diffraction light beam comprising:
- a first light-transmitting material, a second light-transmitting material and a third light-transmitting material,
- wherein the first light-transmitting material and the second light-transmitting material are adjacent to each other via a first interface,
- the second light-transmitting material and the third light-transmitting material are adjacent to each other via a second interface,
- a refractive index of the first light-transmitting material and a refractive index of the second light-transmitting material are equal for the light beam polarized in the first direction and different for the light beam polarized in the second direction,
- a refractive index of the second light-transmitting material and a refractive index of the third light-transmitting material are equal for the light beam polarized in the first direction and different for the light beam polarized in the second direction,
- the first interface has a step-like shape, and
- the second interface has a groove shape formed of periodic protrusions and depressions.

5. An optical element, transmitting a light beam polarized in a first direction, and bending a traveling direction of a light beam polarized in a second direction that is perpendicular to the first direction and diffracting the light beam polarized in the second direction,
- wherein the optical element generates a first diffraction light beam obtained by bending the traveling direction of an incident light beam polarized in the second direction and a second diffraction light beam, which is a +1-order diffraction light beam or a −1-order diffraction beam with respect to the first diffraction light beam comprising:
- a first light-transmitting material and a second light-transmitting material,
- wherein the first light-transmitting material and the second light-transmitting material are adjacent to each other via an interface,
- a refractive index of the first light-transmitting material and a refractive index of the second light-transmitting material are equal for the light beam polarized in the first direction and different for the light beam polarized in the second direction, and a shape of the interface is defined by a shape function expressed by a sum of a function $d_1$ representing a sawtooth groove shape or a step-like shape and a function $d_2$ representing a groove shape formed of periodic protrusions and depressions.

6. An optical element, transmitting a light beam polarized in a first direction, and bending a traveling direction of a light beam polarized in a second direction that is perpendicular to the first direction and diffracting the light beam polarized in the second direction, wherein the optical element generates a first diffraction light beam obtained by bending the traveling direction of an incident light beam polarized in the second direction and a second diffraction light beam, which is a +1-order diffraction light beam or a −1-order diffraction beam with respect to the first diffraction light beam comprising:

a first light-transmitting material and a second light-transmitting material, wherein the first light-transmitting material and the second light-transmitting material are adjacent to each other via an interface, a refractive index of the first light-transmitting material and a refractive index of the second light-transmitting material are equal for the light beam polarized in the first direction and different by $\Delta n$ for the light beam polarized in the second direction, and when $\lambda$ is a wavelength of the incident light, a shape of the interface is defined by a shape function expressed by a remainder obtained by dividing by $\lambda/\Delta n$ a sum of a function $d_1$ representing a sawtooth groove shape or a step-like shape and a function $d_2$ representing a groove shape formed of periodic protrusions and depressions.

7. The optical element according to claim 1, comprising as one piece a wave plate for converting the light beam polarized in the first direction into a circularly polarized light beam.

8. The optical element according to claim 2, comprising as one piece a wave plate for converting the light beam polarized in the first direction into a circularly polarized light beam.

9. The optical element according to claim 3, comprising as one piece a wave plate for converting the light beam polarized in the first direction into a circularly polarized light beam.

10. The optical element according to claim 4, comprising as one piece a wave plate for converting the light beam polarized in the first direction into a circularly polarized light beam.

11. The optical element according to claim 5, comprising as one piece a wave plate for converting the light beam polarized in the first direction into a circularly polarized light beam.

12. The optical element according to claim 6, comprising as one piece a wave plate for converting the light beam polarized in the first direction into a circularly polarized light beam.

* * * * *

UNITED STATES PATENT AND TRADEMARK OFFICE
CERTIFICATE OF CORRECTION

PATENT NO. : 6,927,375 B2
DATED : August 9, 2005
INVENTOR(S) : Yamamoto et al.

It is certified that error appears in the above-identified patent and that said Letters Patent is hereby corrected as shown below:

Column 22,
Line 24, "direction of light beam" should read -- direction of a light beam --.

Signed and Sealed this

Fourteenth Day of March, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,927,375 B2 | Page 1 of 1 |
| APPLICATION NO. | : 10/312436 | |
| DATED | : August 9, 2005 | |
| INVENTOR(S) | : Yamamoto et al. | |

It is certified that error appears in the above-identified patent and that said Letters Patent is hereby corrected as shown below:

Front page, before (51): insert

-- (30)   Foreign Application Priority Data
June 29, 2000 (JP) ..........................2000-196398--

Signed and Sealed this

Fifth Day of December, 2006

JON W. DUDAS
*Director of the United States Patent and Trademark Office*